United States Patent [19]

McGinnis et al.

[11] Patent Number: 5,651,730

[45] Date of Patent: Jul. 29, 1997

[54] PASTEURIZATION OF CARCASSES WITH DIRECTED SHEETS OF HEATED WATER

[75] Inventors: Douglas S. McGinnis; Colin O. Gill, both of Lacombe; Brady P. Chabot, New Saratoga Beach; William J. Popowich, Lacombe, all of Canada

[73] Assignee: Her Majesty the Queen in right of Canada as represented by the Dept. of Agriculture & Agri-food, Lacombe, Canada

[21] Appl. No.: 369,665

[22] Filed: Jan. 6, 1995

Related U.S. Application Data

[63] Continuation-in-part of Ser. No. 178,069, Jan. 6, 1994, abandoned.

[51] Int. Cl.⁶ .................................................. A22B 5/08
[52] U.S. Cl. ..................................... 452/74; 452/77
[58] Field of Search .............................. 452/24, 76, 77

[56] References Cited

U.S. PATENT DOCUMENTS

| | | |
|---|---|---|
| 3,135,016 | 6/1964 | Ekstam . |
| 3,178,763 | 4/1965 | Kolman . |
| 3,343,477 | 9/1967 | Ekstam . |
| 3,520,011 | 7/1970 | Lehman et al. ............... 452/77 |
| 3,523,326 | 8/1970 | Ambill ........................ 452/77 |
| 3,561,040 | 2/1971 | Floden ........................ 452/77 |
| 4,279,059 | 7/1981 | Anderson et al. .............. 452/77 |
| 4,309,795 | 1/1982 | Simonsen ..................... 452/76 |
| 4,337,549 | 7/1982 | Anderson et al. . |
| 4,829,637 | 5/1989 | Norrie . |
| 4,868,950 | 9/1989 | Harben, Jr. . |
| 4,965,911 | 10/1990 | Davey ........................ 452/77 |
| 5,093,140 | 3/1992 | Watanabe . |
| 5,326,308 | 7/1994 | Norrie ........................ 452/77 |

OTHER PUBLICATIONS

Snijders, et al (1977) Abstract: "Hygiene in Pig Slaughtering: Using an Infrared Tunnel on the Killing Line," *Die Fleischwirfschaft*. 57: 2216–2219.

Acuff, G.R., et al., (1988). Microbiological and sensory characteristics of pork lion chops: role of subcutaneous fat. Meat Sci. 23:165–177.

Bell, et al., 1986. Microbiological Sensory Tests of Beef Treated with Acetic and Formic Acids. Journal of Food Protection, vol. 49, No. 3, pp. 207–210 (Mar. 1986).

(List continued on next page.)

*Primary Examiner*—Willis Little
*Attorney, Agent, or Firm*—Greenlee Winner and Sullivan, PC

[57] ABSTRACT

An animal carcass pasteurization apparatus and process is provided. Carcasses are suspended from a movable gambrel and are conveyed through a housing containing a heated water distribution system. Preferably, the gambrel extends through the top of the housing in a sealed manner, excluding contaminants from outside of the housing. The distribution system comprises a plurality of distribution elements and means for supplying heated water thereto. The distribution elements preferably comprise overhead and lower arrays of nozzles. Each nozzle dispenses and directs a discrete and substantially continuous sheet of heated water to contact the carcass. The overhead array directs sheets of water downwardly onto the carcass, forming a layer of heated water which flows over the exterior contours of the carcass, for pasteurization of the upper and lateral surfaces of the carcass. The lower array directs heated water upwardly to contact and pasteurize the underside of the carcass. Opposing side-located nozzles can be added to direct heated water into contact with the lateral portions of the carcass which are otherwise shielded from the flowing layer of water.

18 Claims, 12 Drawing Sheets

OTHER PUBLICATIONS

Davey, et al., 1989. A Laboratory Evaluation of a Novel Hot water Cabinet for the Decontamination of sides of beef. International Journal of Food Science and Technology, (1989) 24:305–316.

Davey, et al., (1989). Theoretical analysis of two hot water cabinet systems for decontamination of sides of beef. International Journal of Food Science and Technology (1989) 24:291–304.

Gerats, et al., 1981. Slaughter techniques and bacterial contamination of pig carcasses. Proc. 27th Eur. Meet. Meat Res. Workers, Vienna, Aug. 28, 1981, vol. 1 p. 198.

Gill, C.O., (1982). Microbial interactions with meat. In Meat Microbiology (Ed. M.F. Brown), Applied Science Publishers, London, U.K., pp. 225–264.

Gill, C.O., (1987). Prevention of microbial contamination in the lamb processing plant. In Elimination of Pathogenic Organisms from Meat and Poultry, (Eds. F.J.M. Smulders). Elsevier, Amsterdam, The Netherlands. pp. 203–220.

Gill, et al., 1992. The contamination of pork with spoilage bacteria during commercial dressing, chilling and cutting of pig carcasses. International Journal of Food Microbiology, 16 (1992) 51–62.

Gill, et al., 1989. The storage life of chilled pork packaged under carbon dioxide. Meat Science 26 (1989) 313–324.

Gill, et al., 1993. The presence of *Escherichia coli*, Salmonella and Campylobacter in pig carcasses dehairing equipment. Food Microbiology, 1993, 10:337–344.

Grau, F.M. (1986). Microbial ecology of meat and poultry. In Advances in Meat Research. (Eds. A.M. Pearson & F.R. Dutson). 2:1–47. AVI Publishing Co. Westport.

Kelly, et al., 1981. The Effect of Temperature, Pressure and Chlorine Concentration of Spray Washing Water on Numbers of Bacteria on Lamb Carcasses. Journal of Applied Bacteriology, 1981, 51: 415–424.

Kotula, A.W. (1987). Control of extrinsic and intrinsic contamination of pork. In Elimination of Pathogenic Organisms from Meat and Poultry (Ed. Smulders, F.J.M.) pp. 181–201. Amsterdam, Elsevier Applied Science.

Smith, et al., (1990). Destruction of *Escherichia coli* on sides of beef by a hot water decontamination process. Food Australia 42 (4), pp. 195–198.

Smith, et al., (1992) Destruction of bacteria on fresh meat by hot water. Epidemiol. Infect. (1992), 109:491–496.

Sörqvist, et al., (1986). Bacterial contamination of the scalding water during vat scalding of pigs. Fleischwirtsch. 66(12)1986. p. 1745.

Woolthuis, et al., (1985). Microbial Decontamination of Calf Carcasses by Lactic Acid Sprays. Journal of Food Protection, vol. 48, No. 10, pp. 832–837 (Sep. 1985).

Snijders et al. (1977) Abstract: "Hygiene in Pig Slaughtering; using an infra-red tunnel on the killing line," *Die Fleischwirtschaft*, 57: 2216–2219.

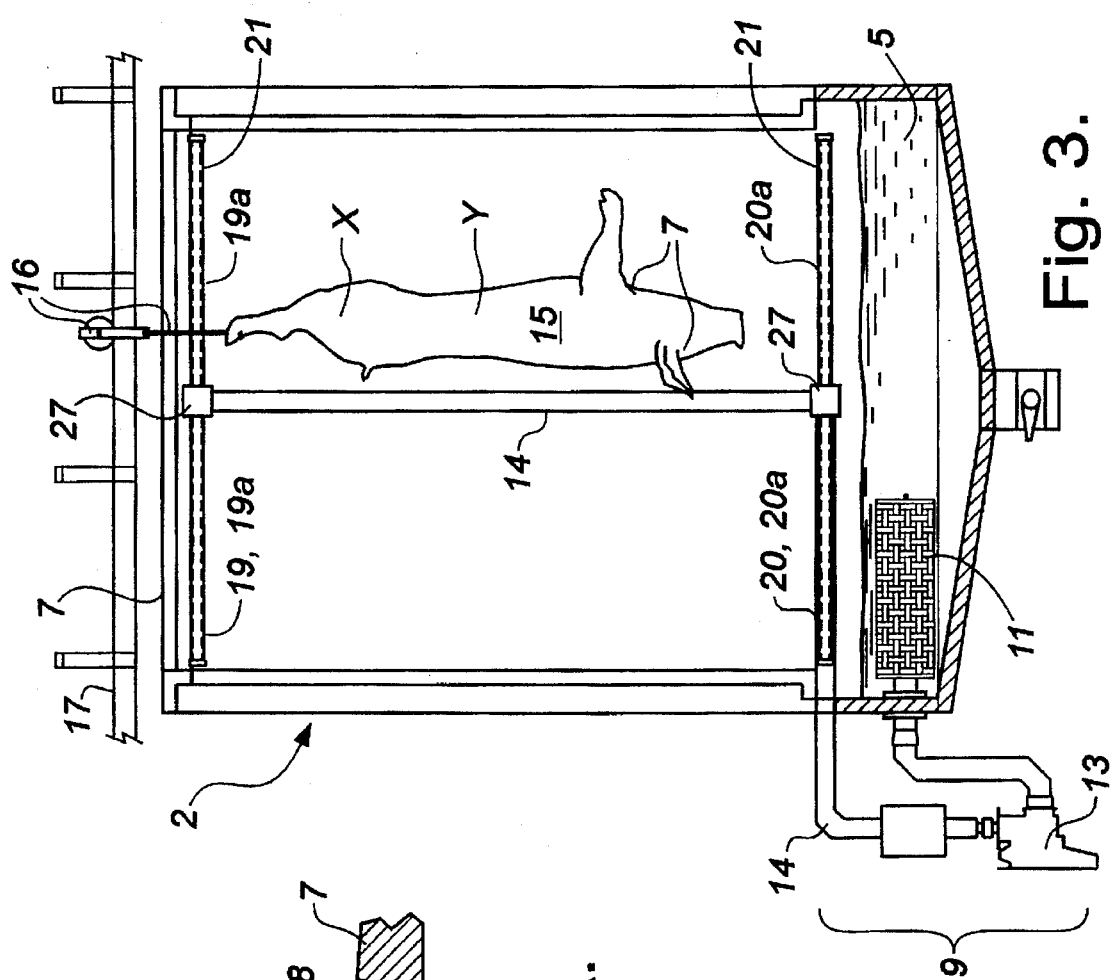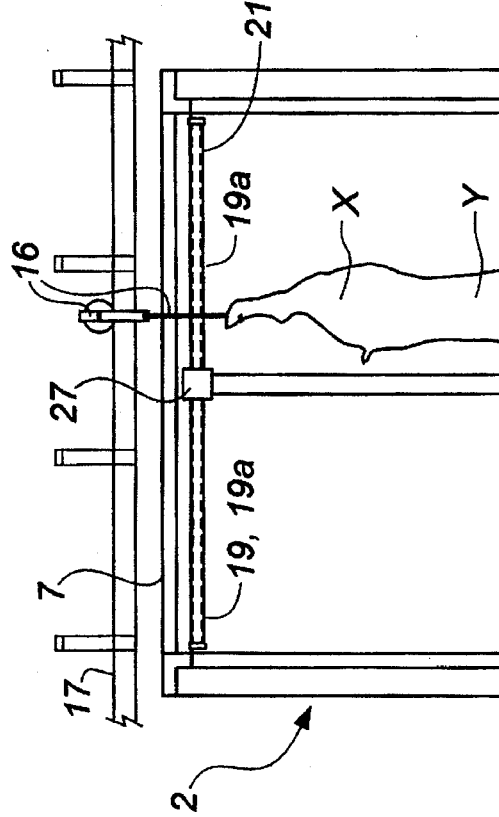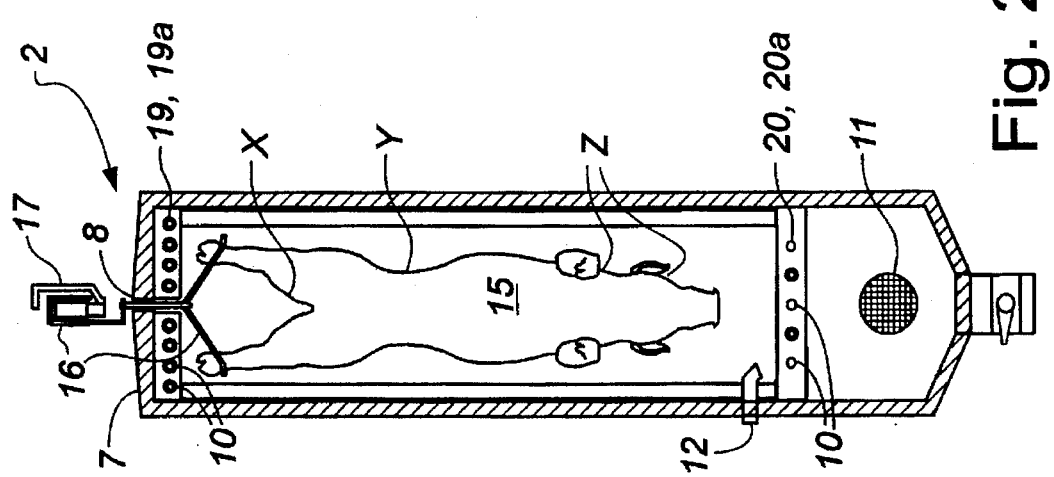

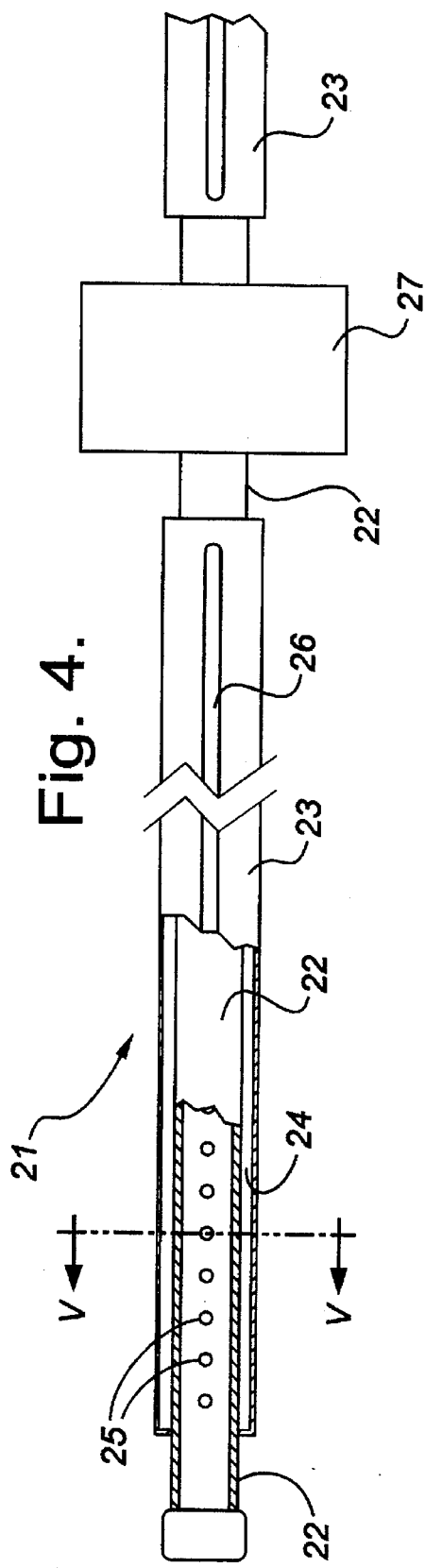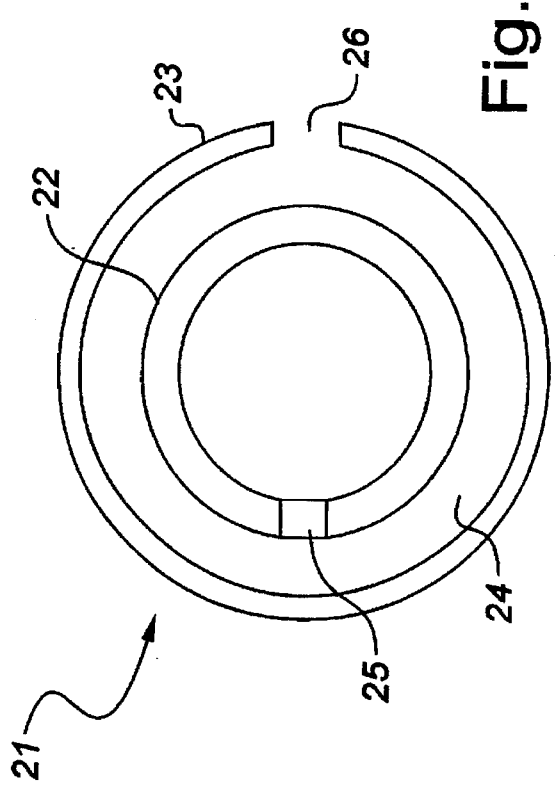

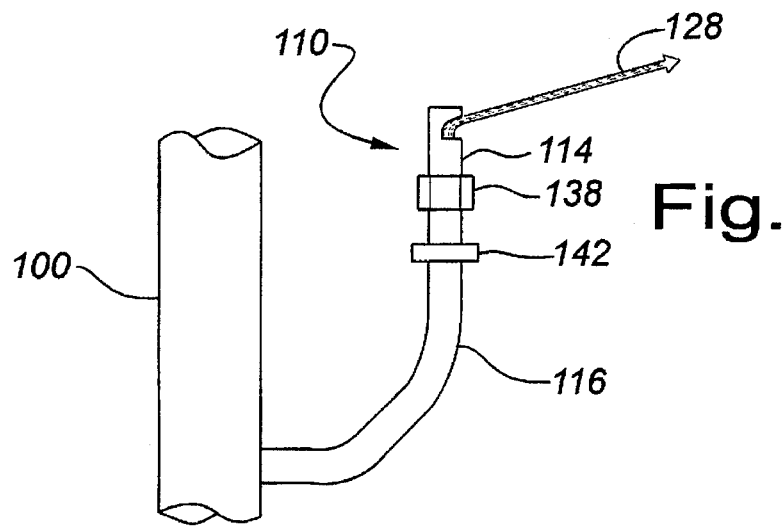
Fig. 13
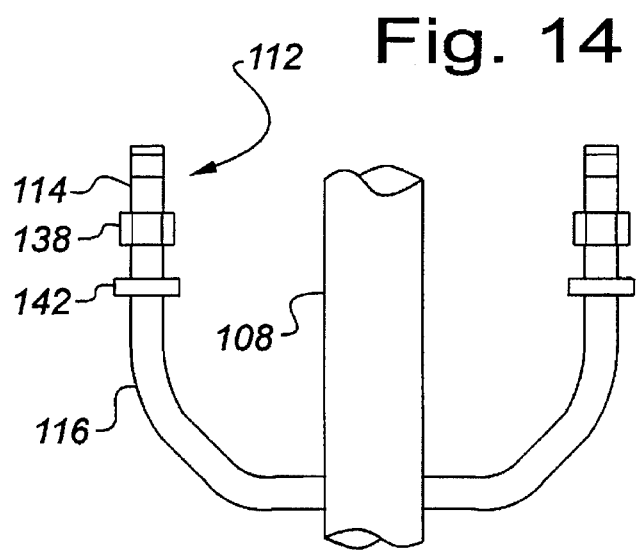
Fig. 14
Fig. 15
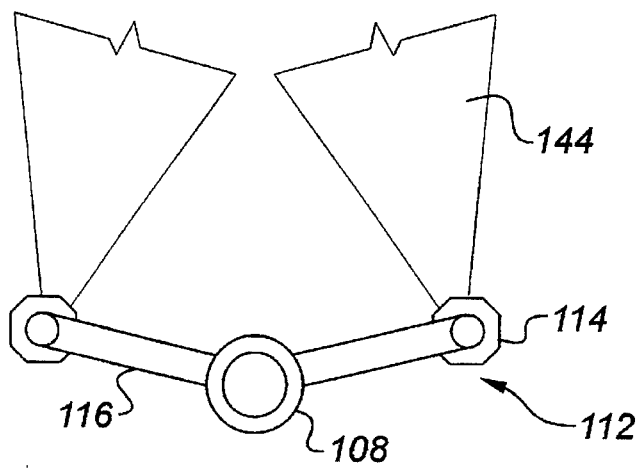

PASTEURIZATION OF CARCASSES WITH DIRECTED SHEETS OF HEATED WATER

This application is a continuation-in-part of U.S. patent application Ser. No. 08/178,069 filed Jan. 6, 1994, now abandoned.

FIELD OF THE INVENTION

The invention relates to an apparatus and process for pasteurizing the surfaces of animal carcasses, prior to chilled storage or further processing of the carcass, using heated water directed onto the carcass in sheets from a plurality of locations.

BACKGROUND OF THE INVENTION

During the processing of hog carcasses, certain bacterial contaminants are introduced or are otherwise associated with the meat that subsequently impact the safety and storage life (spoilage) of pork products. Typically hog carcasses are subjected to scalding in preparation for dehairing. The scalding process comprises spraying with, or submerging the carcass in, hot water (typically about 60° C. for several minutes). This conditions the skin for the dehairing process. The carcass is then singed and scraped (polished), typically with rubber flails, to remove the last vestiges of hair. These steps are conducted prior to eviscerating the hog carcasses. The scalding process is inherently lethal both to most bacteria hazardous to human health and to most bacteria generally responsible for spoilage. Unfortunately, traditional mechanical means used for the actual dehairing and scraping processes are not sterile and reintroduce and contaminate the carcass with pathogenic and spoilage bacteria. During the dressing and fabrication of hog carcasses, bacteria are transferred by the hands of workers and by equipment from the carcass skin to the meat products. Opportunistic spoilage bacteria, which survive the processing, thrive and multiply in the post-processing environment (chilled storage), reducing the storage like and the end products. There are health and commercial benefits which result from decreases populations of pathogenic and spoilage bacteria on meat including: increased safety; increased storage life; improved resistance to the subsequent effects of variable storage and shipping conditions; and compliance with strict foreign importing requirements.

The transfer of bacteria from the skins of animals to meat is also a major hygienic problem in processing other animal carcasses such as sheep and cattle carcasses from which the skin has been removed during dressing. The hygienic condition of flayed carcasses can be improved by using flaying techniques which avoid contact between the outside of the hide and the meat. However, bacterial contamination cannot be wholly avoided. A means of removing or destroying the bacteria on skinned and/or eviscerated carcasses is needed.

In general, destruction or inactivation of bacteria may be accomplished by the process of pasteurization. Pasteurization, as the term is applied in the food industry, is a process by which a very high percentage of a food borne population of microorganisms is killed or rendered incapable of reproduction by raising the internal temperature of the microrganisms to a lethal or critically damaging level in a controlled way (usually by holding the temperature of the microrganisms at a fixed temperature for a fixed time). In contrast to food sterilization processes, more care is given in pasteurization to the inherent sensitivity of the food product to heat exposure to provide an optimum balance between the level of microbial destruction and thermal alternation of the food product. A low-temperature, long-time pasteurization process can achieve the same level of microbial destruction as a high-temperature, short-time process, but the effect on the food product will be vastly different. Negative alteration of the carcass meat (cooking) is minimized by selecting short exposure times at higher temperatures.

The prior art discloses several systems for washing, scalding or decontamination of carcasses prior to refrigeration. Proposals for decontamination include washing dressed carcasses with solutions of chlorine (Kelly et al., J. Appl. Bacteriol. 51 (1981) 415.) or organic acids (Hell et al., J. Food Prot. 49(1986) 207 and Woolthiusetal, J. Food Prot. 48 (1985) 832.), and heating carcass surfaces to pasteurizing temperatures with infrared heater (Snijders et al. Fleischwirtsh 57 (1977) 2216–2219), water sprays (Kelly et al (1981)) or sheets of water (Davey and Smith, Int. J. Food Sci. Technol. 24 (1989) 305). Simple cleaning of carcasses with water using an oscillating system of sprayers is proposed by Anderson in U.S. Pat. No. 4,337,549. A hot spray scalding apparatus for fowl carcasses is proposed by Harben in U.S. Pat. No. 4,868,950. Most of the prior art proposals process animal carcasses that are moving on the overhead dressing rail. Removal of carcasses from the rail is operationally inconvenient and economically disadvantageous.

In U.S. Pat. No. 4,965,911 to Davey and in U.S. Pat. No. 3,523,326 to Ambill, systems are disclosed in which heated water is directed onto carcasses. These references use differing approaches for delivering heated water to the upper, lateral and convoluted areas of carcasses. These areas are often times shielded from the direct line-of-sight trajectory of the water issuing from the distributing means.

The Davey apparatus is designed for treating dressed beef sides. A plurality of longitudinally aligned vertical sheets of heated water (83.5° C.) are introduced from an overflow weir-type water distributing means above the carcass. In order to adapt to convoluted surfaces on the lateral surfaces of a carcass, Davey requires a plurality of baffles positioned at various elevations on either side of the carcass. The baffles impinge the vertically descending sheets of water and deflect them laterally to somewhat better contact the carcass's lateral surfaces. Changes in the size and geometry of the carcass requires manual repositioning of the baffles. Furthermore, the use of deflecting baffles has the tendency of breaking up the descending sheets of water.

In Ambill's apparatus, carcasses are scalded prior to dehairing, using heated water (about 60° C.) introduced from distributing means located on either side of the carcass. The water is deflected laterally under no pressure to contact the lateral areas of the carcass. The deflected water is shown in the patent drawings (FIGS. 4 and 11) as a weak, broken flow or spray falling downwardly onto the carcass. The point of discharge of the distributing means is close to the carcass and vertically movable to oscillate between upper and lower positions, thereby accessing the vertical extent of the carcass. A mechanically complex framework is required to enable the vertical movement of the Ambill's water distributing means. Also, the oscillating, vertical movement of the water distributing means provides only intermittent wetting of portions of the carcass surface. The oscillating vertical movement also contributes to the spray like pattern of the water trajectory.

The rails and carcass suspension means of both the Davey and Ambill apparatus pass within their respective housings, introducing greases and contaminants associated with prior processing stages and the conveying system.

There is a need for a carcass pasteurization cabinet which accepts carcasses of variable geometry without significant modification, uses simple componentry, and yet provides effective pasteurization of the surfaces of the carcass.

SUMMARY OF THE INVENTION

In accordance with the present invention, an animal carcass pasteurization apparatus and process is provided. Carcasses are suspended from a gambrel held by a wheel support that is moveable on a rail for conveyance of the carcass through a pasteurization cabinet. The cabinet comprises a housing containing a heated water distribution system. Preferably, the gambrel support extends through a slot, formed longitudinally along the ceiling of the housing, in a sealed manner to exclude outside contaminants.

The distribution system comprises a supply of heated water and overhead and lower arrays of distribution elements and means for supplying heated water thereto. Each element dispenses and directs a discrete and substantially continuous sheet of heated water to contact the carcass. The overhead array dispenses and directs water downwardly onto the carcass, forming a layer of heated water which flows over the exterior contours of the carcass, for pasteurization of the upper and lateral surfaces of the carcass. The lower array directs heated water upwardly to contact and pasteurize the underside of the carcass. Optionally, opposing side located nozzles can be added to direct heated water more aggressively into contact with convoluted lateral portions of some types of carcasses when those portions are otherwise shielded from the flowing layer of water.

In one broad aspect then, an apparatus for the pasteurization of animal carcasses is provided, the carcasses being suspended from a gambrel and gambrel support, and rail assembly, comprising:

a stationary housing provided an enclosure and having a longitudinal axis along which carcasses are conveyed;

a plurality of first distributing elements positioned within the housing above the carcass, each dispensing and directing a discrete and substantially continuous sheet of heated water downwardly on top of the carcass so that a flowing layer of heated water is formed over the exterior contours of the carcass, for pasteurization of the upper and lateral surfaces of the carcass;

a plurality of second distributing elements positioned within the housing substantially below the carcass, each dispensing and directing a discrete and substantially continuous sheet of heated water upwardly to contact and pasteurize the underside of the carcass; and means for supplying heated water to the first and second distributing elements.

In another broad aspect, the pasteurization apparatus lends itself to an effective process of pasteurizing carcasses comprising:

dispensing and directing a plurality of discrete and substantially continuous sheets of heated water downwardly onto the carcass so that a flowing layer of heated water is formed over the exterior contours of the carcass, for pasteurization of the upper and lateral surfaces of the carcass; while simultaneously dispensing and directing a plurality of discrete and substantially continuous sheets of heated water upwardly for contacting and pasteurizing the underside of the carcass.

The apparatus and process of the present invention is particularly effective in pasteurizing uneviscerated, dehaired hog carcasses, however, it is also useful for pasteurizing other animal carcasses (eviscerated or uneviscerated), with appropriate modifications to accommodate the different carcass geometries.

BRIEF DESCRIPTION OF THE DRAWINGS

FIG. 2 is an end sectional view of the cabinet along lines 2—2 of FIG. 1, showing a hog carcass suspended below the overhead nozzles and above the lower nozzles;

FIG. 2a is a partial cutaway end view of a carcass-suspending gambrel extending through a sealing means into the housing slot;

FIG. 3 is a side sectional view of the cabinet along lines 3—3 of FIG. 1;

FIG. 4 is a partially cutaway side view of a portion of a nozzle shown in FIG. 1, with the tube surfaces being shown as progressively cutaway to reveal successive features;

FIGS. 11–23 illustrate a second preferred embodiment of the invention as follows:

FIG. 11 is a top view of the cabinet showing the first distributing elements as point source nozzles and the water sheet pattern formed;

FIG. 12 is an end sectional view of the cabinet showing a hog carcass suspended in the cabinet showing the distributing elements as point source nozzles;

FIG. 13 is a top view of a point source nozzle connected to a first supply header;

FIG. 14 is a top view of a pair of point source nozzles connected to the second supply header;

FIG. 15 is an end view of a pair of point source nozzles connected to the second supply header;

FIG. 16 is a side view of a point source nozzle;

FIG. 17 is an end view of a point source nozzle showing the water sheet pattern formed;

FIG. 18 is a front view of a point source nozzle showing the inner deflection surface of the deflector, partially cut away to show the inner bore;

FIG. 19 is a top sectional view of the upper portion of the cabinet showing the arrangement of the first distributing elements as point source nozzles;

FIG. 20 is a top sectional view of the middle portion of the cabinet showing the perforated plate to catch carcasses which could fall from the gambrel;

FIG. 21 is a top sectional view of the cabinet showing the arrangement of the second distributing elements as point source nozzles;

FIG. 22 is a side sectional view of the cabinet showing the location of the perforated plate;

FIG. 23 is a side view of a point source nozzle to illustrate the analysis of the forces acting on the water stream.

DETAILED DESCRIPTION OF THE PREFERRED EMBODIMENT

Figure 1:
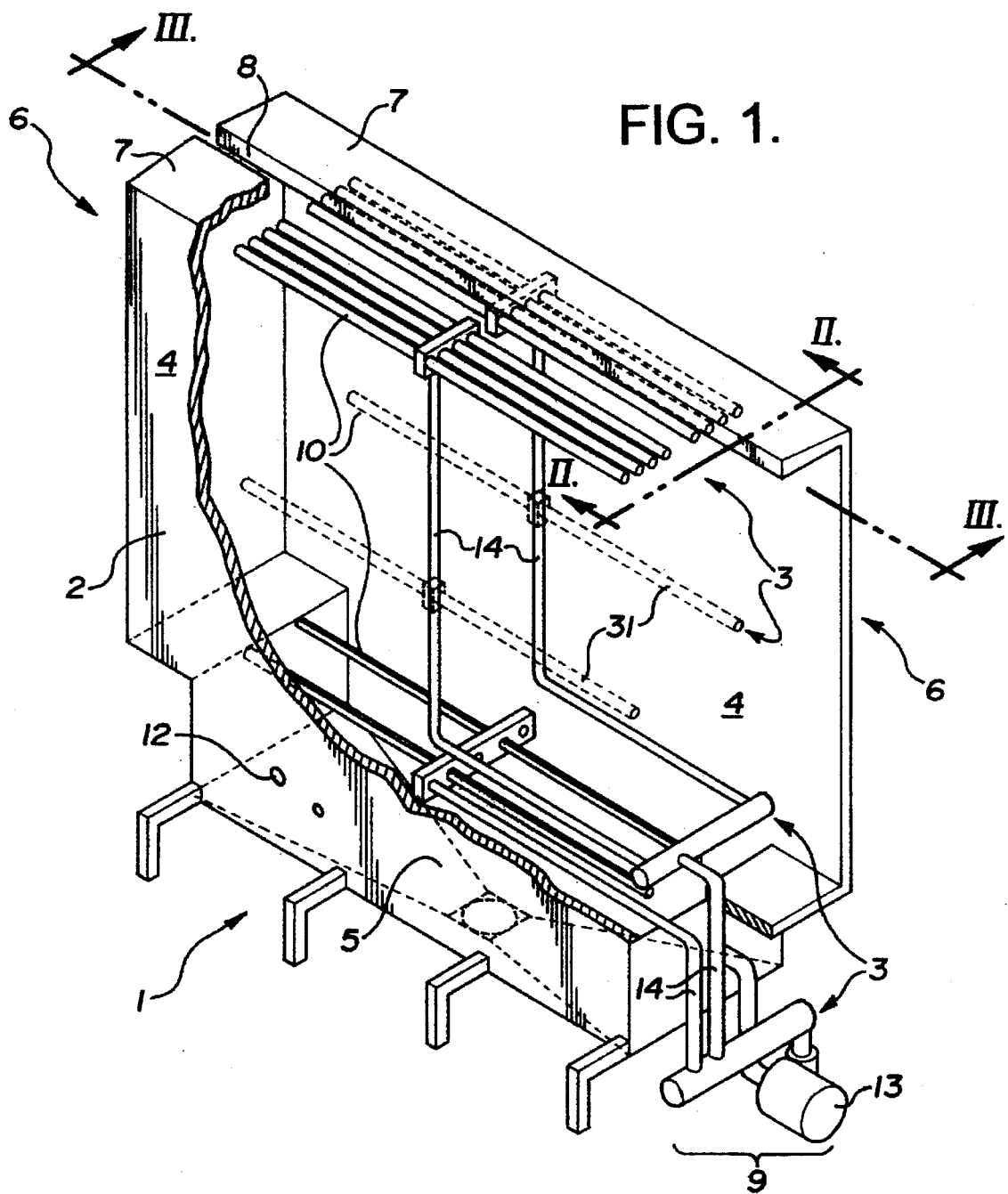
FIG. 1 is a cutaway perspective view of the decontamination cabinet, less entrance and exit vestibules; overhead, lower, and optional side nozzles are shown.

Having reference to FIG. 1, a stationary pasteurization cabinet 1 is provided having a housing 2 and a heated water distribution system 3. The housing 2 comprises opposing and parallel side walls 4 extending upwardly from a water reservoir 5, open entrance and exit ends 6, and a top ceiling 7 divided along its longitudinal axis with a slot 8. Preferably the housing is insulated to minimize heat loss.

The distribution system 3 comprises a pumping system 9 and a water distributing means 10. The pumping system 9 has a screened inlet 11 located in the reservoir 5, a fresh water makeup 12, a water pump 13, and lines 14 for supplying pressurized water to the distributing means 10. Water supplied to the distributing means 10 is heated with an energy source, preferably thermostat controlled in line heaters (not shown), such as temperature regulated steam diffusers, located in the lines 14. The water flowrate (deluge rate), and thus the static pressure of the water, is preferably controlled with conventional flowrate controllers (such as ball valves—not shown) in the lines 14. Water discharged from the distributing means 10 is mostly recovered by gravity drainage into the reservoir 5, although some remains airborne and is lost through the open ends 6 of the housing 2. Preferably entrance and exit vestibules (not shown) are provided with the housing 2 to minimize the energy losses associated with in-rushing cold air or the loss of heated water or moist hot air. The vestibules preferably comprise tunnel-like extensions to the housing 2, with flaps or other isolation means (e.g. air curtain) at the entrance and exit ends to minimize passage of cold air into or through the housing 2. The floors of the vestibules slope downwardly into the tank 5 for collection of splash and hot drip water. Hot moisture vapour loss from the housing 2 is minimized by ventilating the housing 2 and vestibules using an exhaust fan and ventilation system (now shown). The ventilation system preferably includes an air-to-water or air-to-air exchanger.

Referring now to FIGS. 2 and 3, a carcass 15 is suspended in the housing 2 from a wheeled hook or gambrel and gambrel support system 16 (hereinafter "gambrel"). The carcass has upper X, lateral Y, and underside Z surfaces. The gambrel 16 is movable on a rail 17 mounted outside and above the housing 2. The rail 17 is aligned with the slot 8 formed in the housing's top ceiling 7, to enable the gambrel 16 to extend through the slot 8 and into the housing 2. As the gambrel 16 moves along the slot 8, the carcass 15 is conveyed through the housing 2. A shown in FIG. 2a, a sealing means 18, such as a resilient strip gasket, cooperates with the slot 8 to permit free passage of the gambrel 16 therealong while maintaining a seal to protect the interior of the housing 2 from external contaminants.

The water distribution means 10 comprises a plurality of first distributing elements 19 located within the housing 2 above the carcass 15, and a plurality of second distributing elements 20 located within the housing 2 below the carcass 15. Preferably, the first and second distribution elements 19,20 are arranged as first and second arrays 19a, 20a of slot-type distribution nozzles 21, described hereinbelow.

The first array 19a extends the length of, and substantially across the width of the top of the housing 2. The second array 20a extends the length of the lower portion of the housing 2. Preferably, the tubular axis of the nozzles 21 are aligned longitudinally with the housing 2.

Referring to FIGS. 4 and 5, individual nozzles 21 are shown to comprise coextensive inner 22 and outer tubes 23 forming an annulus 24 therebetween. A plurality of openings 25 are spaced axially along the wall of the inner tube 22. The outer tube 23 has axially-extending openings or slots 26 in its wall, which are offset from the inner tube openings 25.

Individual nozzles 21 extend bilaterally from a header 27. Preferably the header 27 is located at the midpoint of the full longitudinal extend of each nozzle 21, thereby minimizing the effects of variable pressure drop and flow along the nozzle 21. Alternately the nozzle openings 25 and slot 26 can be precisely sized to compensate for pressure drop and/or to vary the flowrate along the length of the nozzle. Heated water from lines 14 is delivered to the inner tube 22. The water discharges through the openings 25 to the annulus 24. Water is released under pressure from the annulus 24 through the outer tube's slot 26, dispensing heated water in a substantially continuous intact flume or sheet, directed by the particular orientation of the slot 26. The nozzles 21 provide high volumetric flow without the energy losses associated with atomising sprays. The flowrate (1 min$^{-1}$ or gal min$^{-1}$) and the static water pressure (kPa or psig) at the nozzle outlets are maintained at values sufficient to form the desired sheets of water. Preferably, the water exiting the nozzles 21 remains in the substantially continuous, intact sheets up to the point at which it contacts the carcass. This is controlled by adjusting the water flowrate and static water pressure of the water exiting the nozzles 21.

Figure 24:
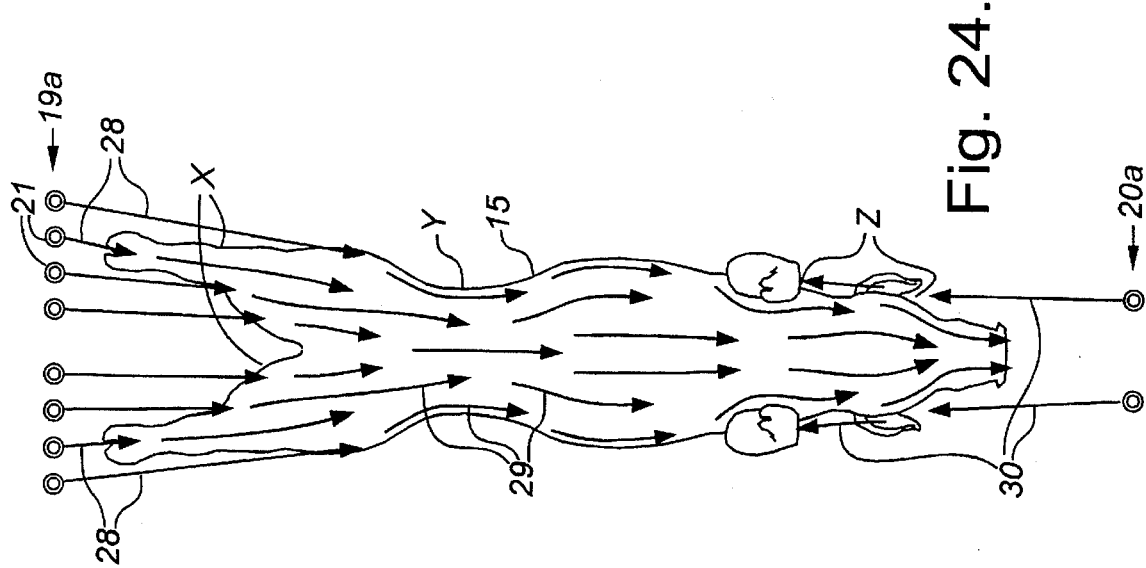
FIG. 24 is an end view of a dehaired, uneviscerated hog carcass showing the directed sheets of heated water from the nozzles and a schematic illustration of the flowing layer of water on the surface of the carcass.

Having reference to FIG. 24, the nozzles 21 of the first array 19a are generally oriented downwardly to dispense and direct a plurality of discrete and substantially continuous sheets of heated water 28 downwardly onto the carcass 15. The width of the first array is sufficient to provide good area coverage of the upper surface X of the carcass. Further, the volume of water discharged from the first array of nozzles 19a is sufficient to envelope the carcass 15 (including the lateral surfaces Y) in a flow layer 29 of heated water. The flowing layer 29 promotes the transfer of thermal energy from the hot water to the contacted surfaces X,Y of the carcass 15 so that pasteurization is achieved.

A plurality of discrete and substantially continuous sheets 30 of heated water are dispensed and directed upwardly from the second array of nozzles 20a to contact the underside surfaces Z of the carcass 15. While the term "sheet" is used to describe the water exiting the second array 20a, it should be understood that water exiting each of the nozzles in the second array 20a has a fountain appearance, due to the action of gravity and downward cascading water. However, the water exits the second array of nozzles 20a as substantially continuous intact sheets, which remain substantially intact at least up to the point at which they contact the carcass. Above this point, the water has a fountain appearance, as indicated above. Although the preferred embodiment depicts the second distributing elements 20 as being an array of nozzles 20a located directly below the carcass 15, the nozzles need only be located lower in elevation than the lowest of the carcass's underside surfaces Z that needs to be pasteurized. The amount of water which issues from the second array 20a is less than that required for the first array 19a and thus the density of nozzles 21 across the width of the housing 2 need not be as great. Also, the flowrate of the water exiting the two arrays of nozzles 19a, 20a, are preferably independently adjustable with the flowrate controls (not shown) in lines 14. A higher flowrate and static water pressure is generally needed to sustain the water sheets from the lower second array 20a than is needed for the upper, first array 19a, to counteract gravity.

The sheets of water 28,30 flow generally simultaneously from the first and second arrays 19a,20a.

For uneviscerated and de-haired hog carcasses having a relatively smooth and generally convex outer surfaces, the flowing layer 29 successfully adheres to the contours of the carcass 15, contacting substantially all of its upper X and later Y surfaces. Some of the underside surfaces Z of the carcass 15, particularly around the shoulder and head regions, are inadequately treated by the first array 19a. These underside surfaces Z are successfully contacted by the upwardly directed sheets 30 of water from the second array 20a.

Optionally, carcasses 15 having more convoluted and concave surfaces (such as eviscerated beef and lamb sides) can be more effectively pasteurized by providing a plurality of third distributing elements 31, located on either side of the housing 2. Preferably the third distributing elements 31 (shown in phantom lines on FIG. 1) comprise slot-type distribution nozzles 21. The nozzles 21 can direct sheets of water laterally, so that topographically difficult lateral surfaces Y of the carcass 15 can be aggressively contacted.

A further aid to improving the contact of pasteurizing water to all surfaces X,Y, and Z, carcass rotating means 33 can be provided for rotating the carcass 15 as it progresses to the housing 2. A shown in FIGS. 6 and 7, the rotating means 33 can comprise an interference-type of arm and post device, although other devices are known and suitable. Opposed turning arms 34 extend horizontally from the gambrel 16. One or more spaced-apart posts 35 are arranged longitudinally and offset slightly from the gambrel's line-of travel on the rail 17. The turning arms 34 are adapted to contact a post 35, causing the gambrel 16 to swivel and the suspended carcass 15 to rotate. As shown in the five-step rotation sequence of FIG. 7, each post provides 180° of rotation. Alternatively, the dimensions and shape of the turning arms 34 and the offset distance of the turning post 35 from the rail 17 may be changed to vary the angular speed of the carcass 15 as is passes through each rotated position. Thus a preferred carcass orientation may be exposed for a longer period of time than a less preferred carcass orientation.

The present invention allows the formation of a continuous flowing layer 29 of heated water adhering to, and virtually completely enveloping the carcass 15. Effective pasteurization of the carcass 15 surface is thus permitted as the entire carcass 15 surface can be heated to a suitable pasteurization temperature (i.e. 85° C.) for an appropriate time period (i.e. at least 10 seconds).

In another preferred embodiment shown in FIGS. 11 to 23, the distributing elements providing the substantially continuous directed sheets of water are point source nozzles. As used herein, the term "point source nozzle" means a water dispensing nozzle in which a continuous sheet of water is dispensed, originating from a one-dimensional point source rather than a line source as from the slot 26 in the previous embodiment. Each point source nozzle distributes a continuous sheet of water which is substantially fan-shaped in its width profile. A substantially greater number of point source nozzles is used than "slot" type nozzles because the individual sheets of water are smaller, and do not extend along as great a portion of the housing 2.

Accommodation of the point source nozzles requires modification of the water distribution means 10 shown in FIG. 1. Referring to FIGS. 11, 12, 13, 14 and 15, the water distribution means 10 shown in FIG. 1 is altered to comprise a pair of first supply headers 100, located within the housing 102 along the upper inside longitudinal edges 104 of the housing 102 above and to either side of the carcass 106, and a second supply header 108, located within the housing 102 below the carcass 106. The first supply headers 100 extend the length of the top of the housing 102. The second supply header 108 extends the length of the lower portion of the housing 102.

A plurality of first distributing elements 110 are spaced along the first supply header 100, projecting inwardly towards the carcass 106. A plurality of second distributing elements 112 are spaced along the second supply header 108, projecting upwardly towards the carcass 106.

Referring to FIGS. 13-17, each first and second distributing element 110,112 comprises a point source nozzle 114 connected through tubes 116 to the supply headers 100,108. The tubes 116 are preferably of sufficient length that a water stream delivered to the distributing elements 110,112 through the tubes 116, becomes stable and non-turbulent before reaching the distributing elements 110,112. Each nozzle comprises a cylindrical nozzle body 118, forming a centrally disposed bore 120, preferably circular in cross section through which a stream of hot water is conducted under pressure. At its free end 122, the nozzle 114 has an outlet 124 from which the stream of water is dispensed. A deflector 126 for deflecting and shaping the water stream into a substantially continuous fan-shaped sheet of water 128 projects from the free end 122 of the nozzle 114. The deflector 126 has a smooth arcuate, concave inner deflection surface 130, marginally occluding at its proximal edge 132 one edge of the outlet 124, and curving across the axis of the bore 120 to the distal edge 134 of the deflector 126. In this way, each point source nozzle 114 dispenses a discrete and substantially continuous sheet of water 128 which is substantially fan-shaped in its width profile. The angle formed between the axis of the bore 120 and the plane of the sheet of water 128 is preferably about 75°.

Figure 18:
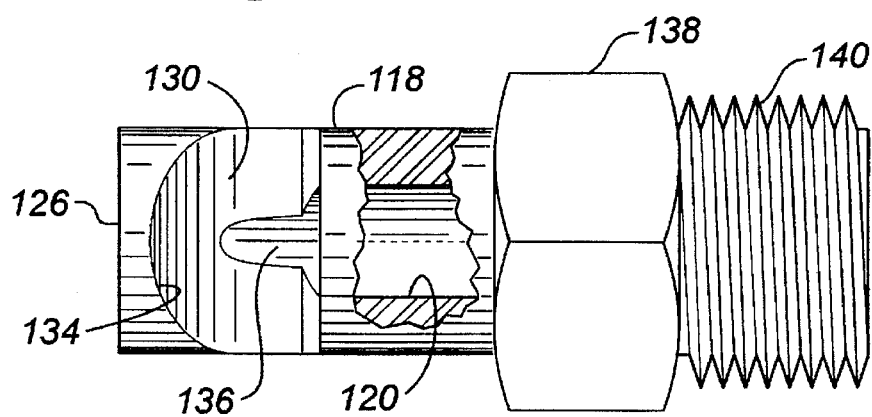
Figure 21:
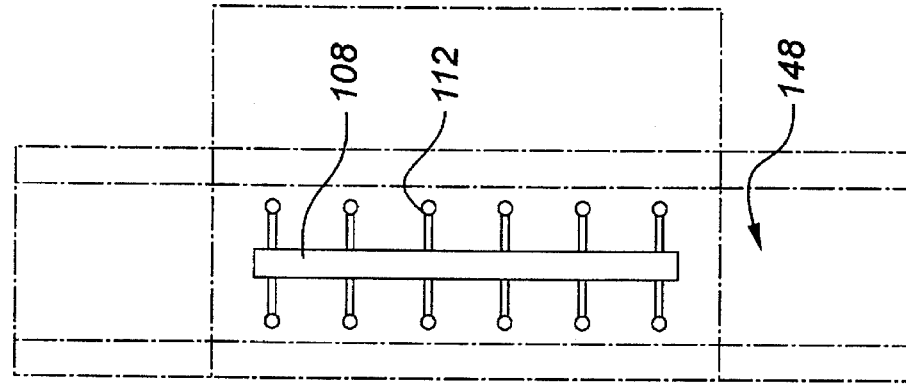
Figure 20:
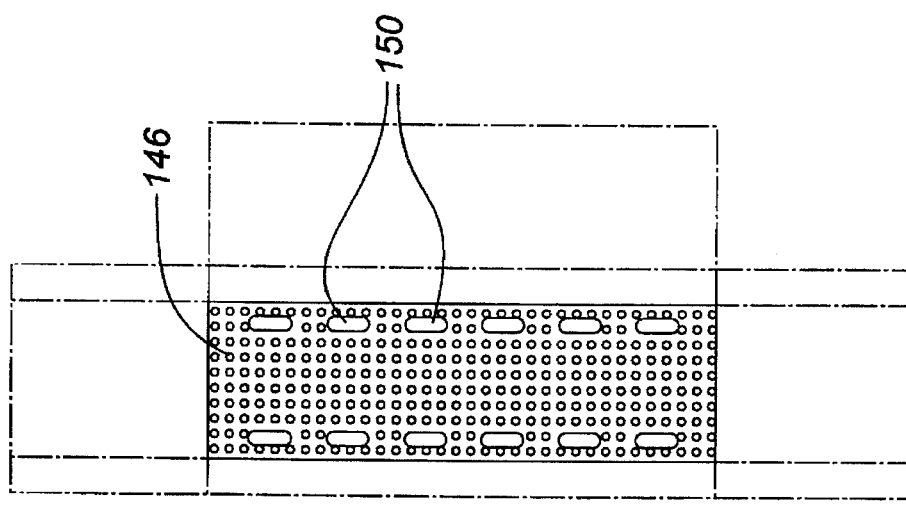

Referring to FIG. 18, the deflector 126 is shown to form a tapered groove 136 in the inner deflection surface 130 contiguous with the edge of the outlet 124. The cross-sectional profile of the groove 136 forms a section of the circumference of the outlet 124. The diameter of the bore 120 is preferably in the range of 8–28 mm (0.3–1.1") and is approximately ⅓ the width of the inner deflection surface 130. A portion of the cylindrical nozzle body 118 is shaped to form a nut 138 which can be grasped with a wrench to turn the nozzle 114 for installation or removal. The cylindrical nozzle body 118 is threaded at its connected end 140 to allow coupling of the nozzle with the tube 116. Particularly preferred point source nozzles are FloodJet®K brand wide angle nozzles, manufactured by Spraying Systems Company (1993) of Wheaton, Ill. U.S.A. and supplied by John Brooks Company Ltd. of Mississauga, Ontario, Canada. It is recognized that other point source nozzles which provide substantially continuous sheets of water may be described in the literature or may be readily developed by persons skilled in the art.

Figure 19:
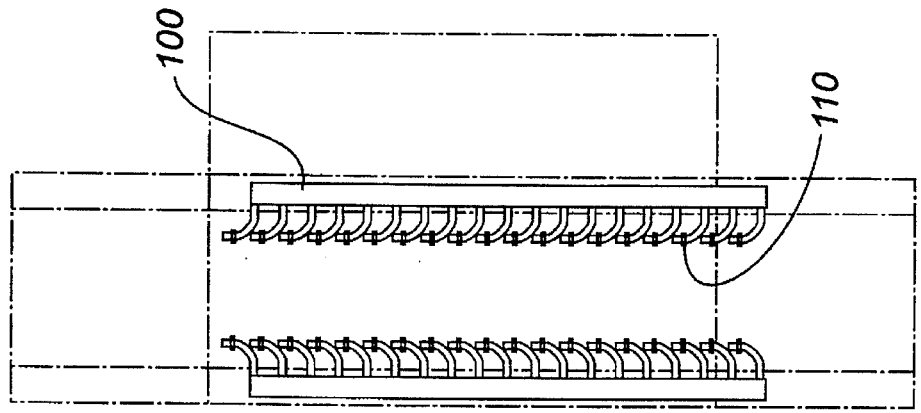
Figure 22:
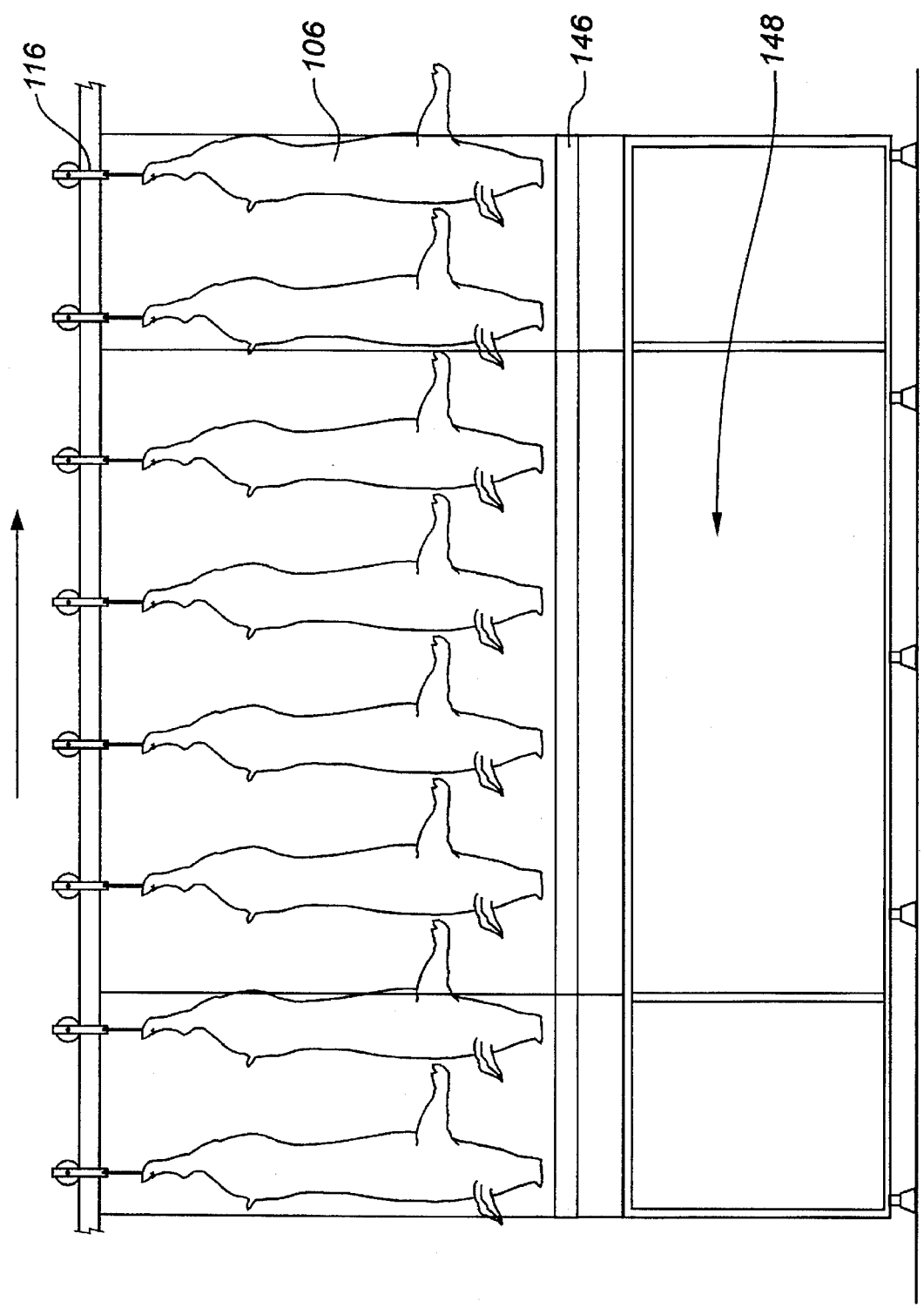

Referring to FIGS. 13 and 19, an array of first distributing elements 110 projects from each first supply header 100 and are connected to the supply header by tubes 116. The array of nozzles 114 projecting from each first supply header 100 may be arranged exactly parallel relative to the nozzles on the other first supply header 100, or they may be staggered relative to each other. Each nozzle 114 is connected to the tube 116 by a keyed union or joint 142. The direction in which the sheet of water 128 is dispensed from each first distributing element 110 may be adjusted through this joint 142. The first supply headers 100 are located along the upper inside longitudinal edges 104 of the housing 102. Though the first supply headers 100 and the first distributing elements 110 projecting from the first supply headers 100 are not located directly over the carcass 106, they are still located above the carcass 106 in terms of elevation. As used herein, a series of distributing elements 110,112 spaced along a particular supply header 100, 108 may be described as an "array" of distributing elements 110,112.

Referring to FIGS. 14, 15, 20, 21 and 22, pairs of second distributing elements 112, project bilaterally from the second supply header 108. Each second distributing element 112 comprises the point source nozzle 114 connected through a keyed union or joint 142 to the tube 116. The tubes 116 are connected to the supply header 108 at such an angle that the nozzles 114 and the sheets of water 144 are dispensed by the second distributing elements 112 are directed somewhat inwardly, preferably at an angle of about 15° from the vertical.

A perforated plate 146 is located at the base 148 of the housing 102 above the second water distributing elements 112. Slotted openings 150 are formed in the plate 146 above each second water distributing element 112, to allow the passage of sheets of water 144 through the plate 146. The plate 146 is provided to catch carcasses 106 which may accidentally fall from the gambrel 152.

Referring to FIGS. 11, 12, 13 and 15, heated water is delivered to the first and second supply headers 100 and 108 under pressure, passes through the tubes 116, and is discharged from the first and second distributing elements 110 and 112. Heated water discharged from the nozzle outlet 124 (FIG. 16) is redirected and shaped by the curved inner deflection surface 130 to form a substantially continuous flat sheet having a fan-shaped shape in its width profile 128,144. The average thickness of the sheet 128,144 is preferably in the range of 2–3 mm. The gauge pressure of the water at the point of discharge is maintained at a level sufficient to provide the desired substantially continuous sheets of water 128,144 and is preferably in the range of 17–21 kPa (approximately 2.5–3.0 psig). Preferably, the distance from the first distributing elements 110 to the carcass 106 surface is less than about 1 m.

Figure 11:
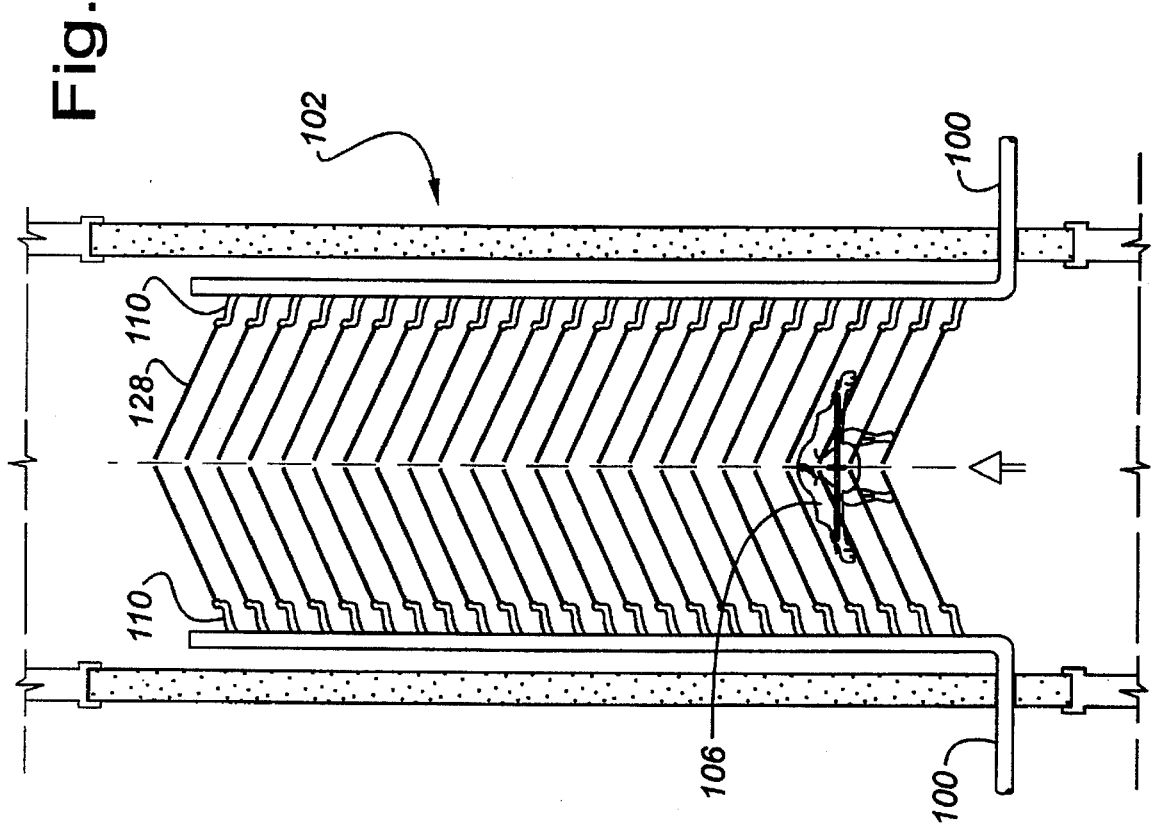
Figure 16:
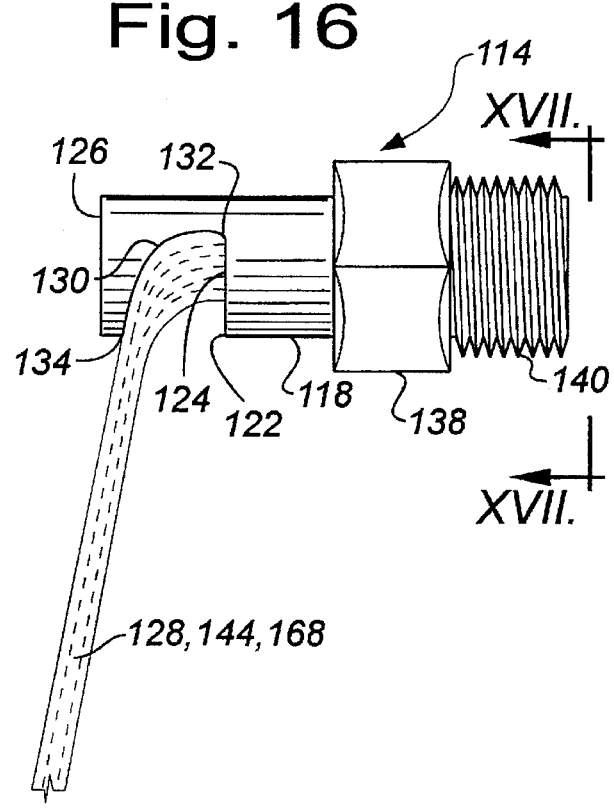
Figure 17:
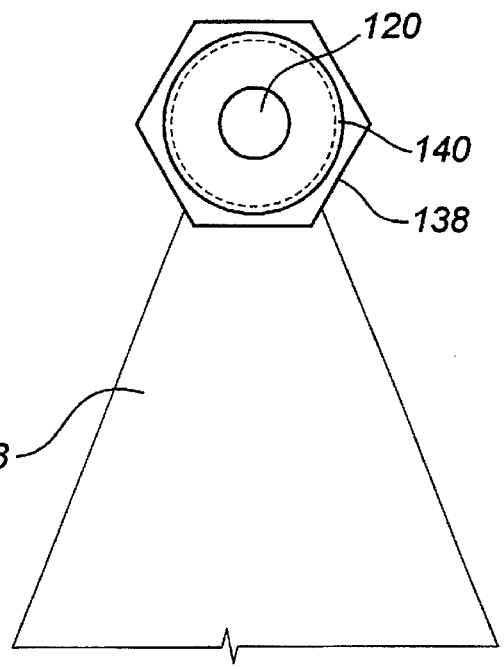

Referring to FIG. 11, the nozzles 114 projecting from the first supply headers 100 are oriented so that the sheets of water 128 are discharged in the vertical or substantially vertical plane, and may be directed either perpendicular to the direction of carcass travel or at an angle biased in the direction of travel of the carcass 106. When directed at an angle in the direction of travel of the carcass 106, the sheets of water 128, acting together, viewed from above, form a "chevron" pattern, meeting at or near the center of the housing 102. When discharged perpendicular to the direction of carcass travel, the sheets of water 128 discharged from one first supply header 100 will meet of overlap the sheets of water 128 discharged from the opposing first supply header 100. Discharge of water as parallel spaced sheets minimizes sheet-to-sheet flow interference, breakup, and heat loss to the environment resulting from turbulence effects and mixing of the water sheets with air. The design of the water distribution means 10 (FIG. 1) can be optimized with respect to energy and water consumption by adjusting the combination of the separation distance between the parallel sheets of water 128 and the total volumetric discharge rate of the sheets of water 128, subject to the requirement that continuous hot water coverage of the carcass 106 is achieved, and that the rate of water delivery to the carcass 106 surfaces is sufficient to uniformly maintain all of the carcass 106 surface at the pasteurization temperature (e.g. 85° C.). The distance between the sheets of water 128 is preferably between 76–152 mm (3–6 inches), but could be as low as 6 mm (0.25 inches).

The second distributing elements 112 projecting from the second supply header 108 are oriented so that the sheets of water 144 are discharged upwardly toward the carcass 106, in a plane perpendicular to the direction of travel of the carcass 106. The distance between the parallel sheets of water 144 is preferably about 44 cm. The gauge pressure of the water at the point of discharged from the second distributing elements 112 is preferably in the range of 17–21 kPa (approximately 2.5–3.0 psig). Preferably, the distance from the second distributing elements 112 to the carcass 106 is less than about 30 cm.

Figure 12:
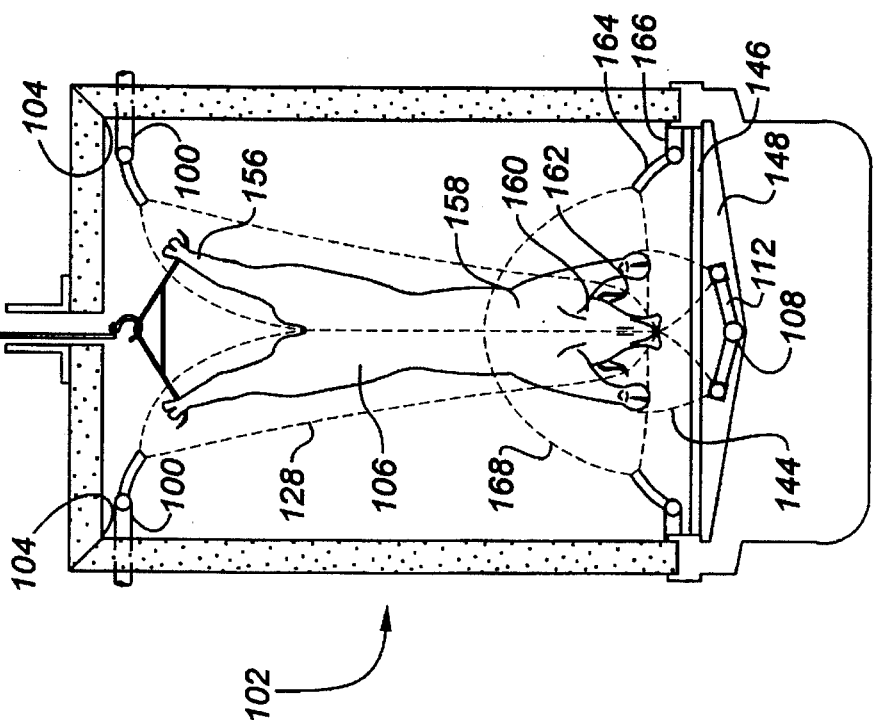

Referring to FIGS. 11 and 12, the width of the sheet of water 128, discharged from each first distributing element 110, along the line of contact with the carcass 106, is selected to be sufficient to achieve top-to-bottom coverage of the carcass 106. Preferably, sheets of water 128 originating from the first distributing elements 110 impact the carcass 106 to provide a line of contact from the tips of the hind legs 156 to the forequarter shoulder region 158. Coverage of the lateral surfaces of the carcass 106 is achieved by the movement of the carcass 106 through the array of parallel sheets of water 128. The surface tension of the water sheets 128 allows the sheets 128 to bend slightly and remain in contact with the passing carcasses 106, tending to facilitate uninterrupted wetting of the carcass 106 surface. Thus, a sufficient volume of water is discharged from the first distributing elements 110 to envelope the carcass 106 in a flowing layer of heated water. The flowing layer adheres to the contours of the carcass 106, providing virtually complete coverage of the entire carcass 106 surface.

Underside surfaces of the suspended carcass 106, including under the front legs 160 and under the ears 162 may be inadequately treated by the water sheets 128 from the first distributing elements 110 and are successfully contacted by the upwardly directed water sheets 144 from the second distributing elements 112.

Optionally, carcasses 106 having more convoluted and concave surfaces can be more effectively pasteurized by providing a plurality of third distributing elements 164, positioned on either side of the carcass 106. In that case, a pair of third supply headers 166, one located on either side of the housing 102 and extending the length of the housing 102 are provided. The third distributing elements 164 are spaced along the third supply headers 166, projecting inwardly towards the carcass 106. Preferably, the third distributing elements 164 comprise point source nozzles 114 of the same design and function as in the first and second distributing elements 110,112. The third distributing elements 164 are oriented to direct sheets of water 168 laterally to contact the lateral surfaces of the carcass 106.

Figure 5A:
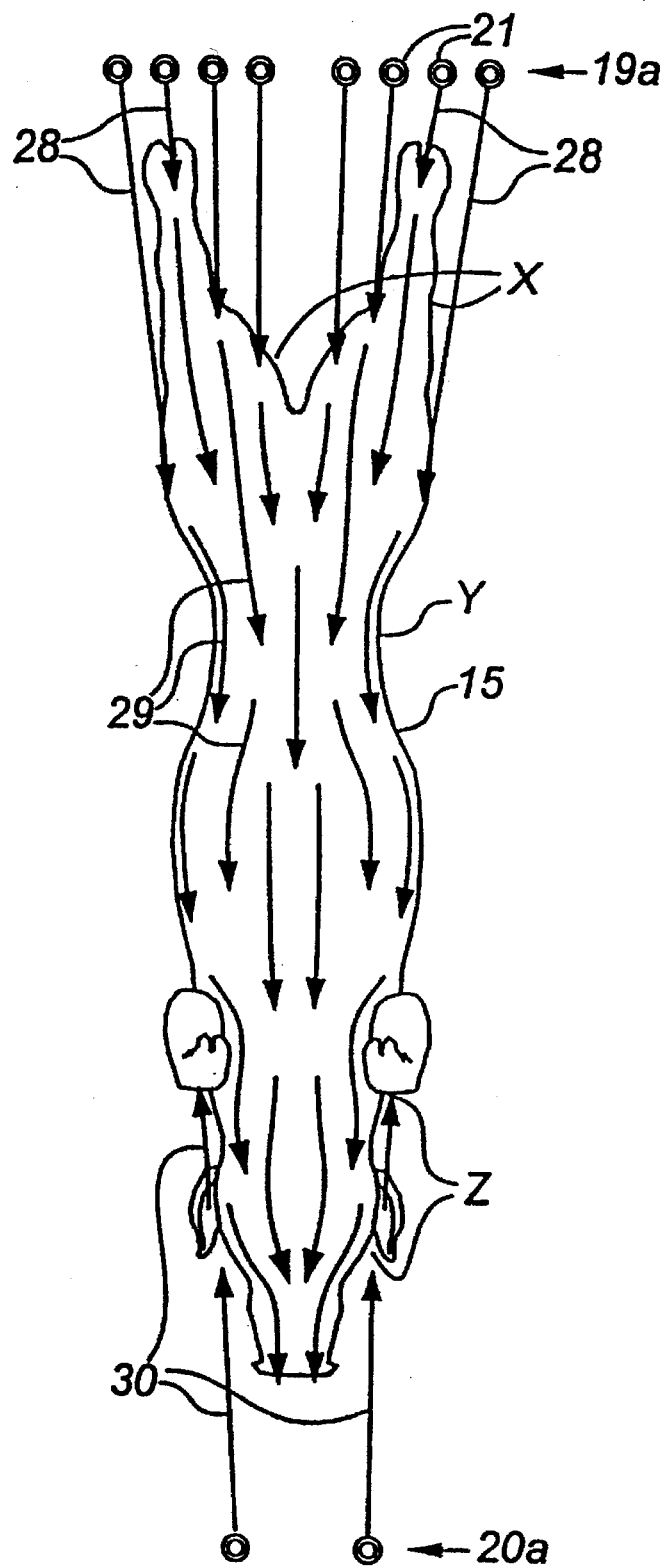
FIG. 5 is a cross-sectional view of a nozzle along line 5—5 of FIG. 4 showing the relative orientation of the outer tube slot and the inner tube openings.

As with the first embodiment, the present embodiment of this invention provides effective pasteurization of the carcass 106 surface as the entire carcass 106 surface can be heated to a suitable pasteurization temperature (i.e. 85° C.) for an appropriate time period (i.e. at least 10 seconds) via the formation of a continuous flowing layer 29 as shown in FIG. 5a, adhering to, and virtually completely enveloping the carcass 106.

Figure 23:
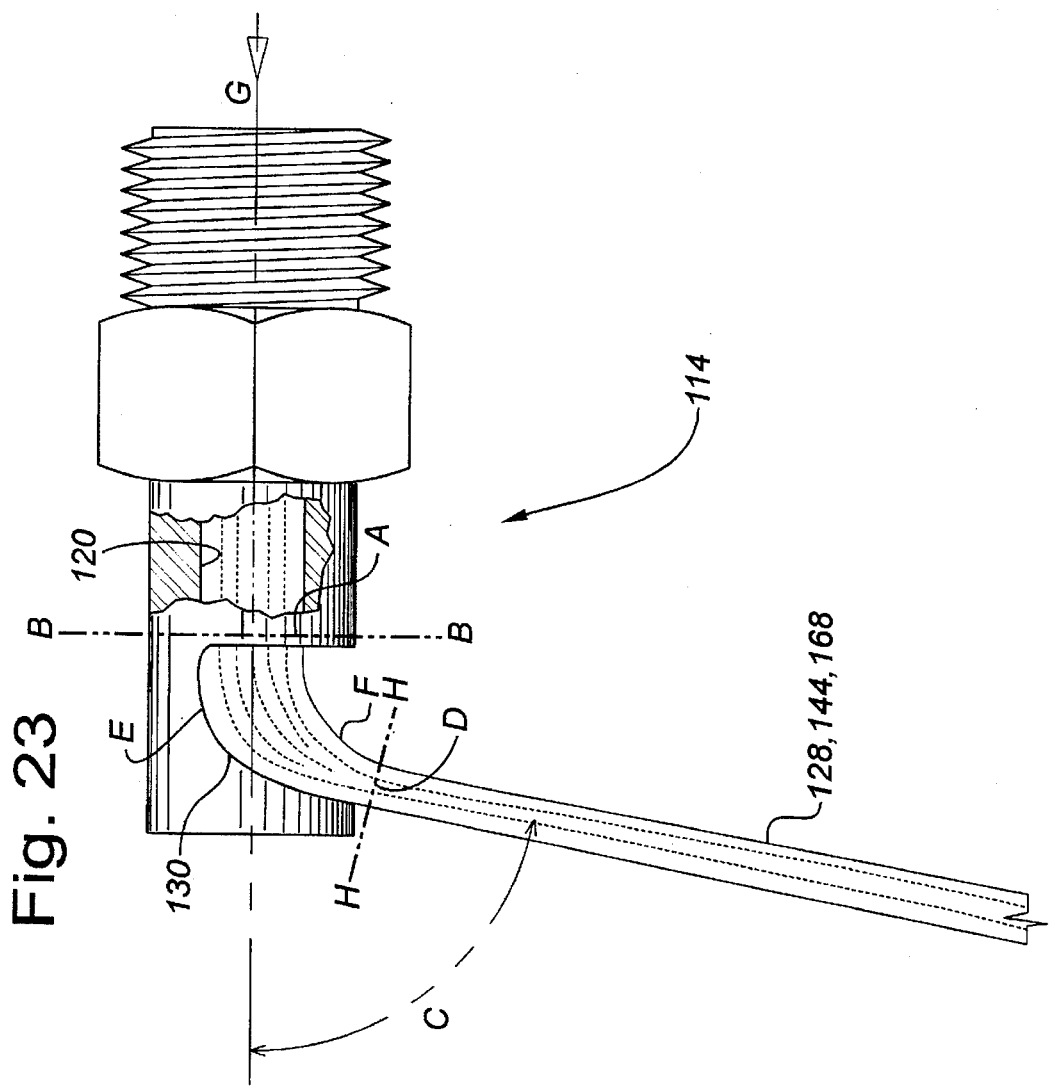

Alternate point source nozzles and means to deflect and shape a water stream may be designed to supply the substantially continuous sheets required by this invention. The following description is included to assist in designing or selecting such nozzles. The desired shape of a sheet of liquid water produced by a hypothetical curved deflector as depicted in FIG. 23 can be designed using engineering principles of fluid mechanics. Referring to FIG. 23, liquid flows through the circular bore 120 at A at average velocity $u_1$ and gauge pressure $p_1$, having a circular cross-section and area $A_1$ at line (cross-section) B—B. The stream flows onto the concave deflecting surface 130 at the terminal end of the nozzle 114 and is thereby deflected at angle C from the axis of the flow direction at D. At D, the fluid has an average velocity of $u_2$ and pressure $p_2$. The liquid flowing between A and D exerts a pressure on the curved deflecting surface 130 that is a result of the rate of change of momentum of the liquid (in the three coordinate directions), plus the static pressure of the liquid. The static pressure and rate of momentum transfer varies continuously along the path formed by the curved deflecting surface 130. The concave deflecting surface 130 exerts an equal and opposite pressure or force E on the liquid which can be represented by a single force vector having x and y components. The forces (pressure) within the liquid stream will vary from a minimum at the free surface F (approximately atmospheric pressure, neglecting surface tension) to the maximum force exerted at the deflecting surface 130.

Dynamic forces and pressures exerted upon the water stream in the z direction (i.e. perpendicular to the page in FIG. 23) such as static pressure, pressures which arise from a change in z direction momentum, and surface drag will theoretically influence the ultimate shape of the sheets of water 128, 144, 168 (i.e. rate of lateral spread or sheet angle). However, ignoring the effects of gravity, and in consideration of the lateral flow symmetry of the entire discharge stream, the sum of these forces will tend to balance one another, such that the average z direction component of water sheet 128, 144, 168 velocity would be zero.

The opposing surface/liquid forces and the resulting pressure gradients set up within the water stream G as it passes over the deflecting surface 130 cause the stream to become flattened during the process of achieving a uniform internal energy distribution within the stream G. The flattened stream G develops a cross-sectional area $A_2$ at line (cross-section) H—H. The liquid average velocity at each cross-section of the flow stream G can be estimated from analysis of the various forces in the x, y, and z coordinate directions.

The nozzle 114 interior and flow conditions upstream from the nozzle 114 should be designed to cause liquid to flow through the nozzle bore 120 so that the individual trajectories of adjacent water molecules tend to be parallel between adjacent close cross-sections of the flow, providing virtually parallel streamlines ("streamline flow"). Generally, this may be achieved by avoiding abrupt changes in the overall flow direction of the liquid upstream from, and within the nozzle 114. This requires that the streamline section of the nozzle bore 120 be greater than a determinable minimum length. The length of the streamline section depends on numerous factors such as upstream flow conditions, fluid viscosity, mean velocity, nozzle specifications and physical characteristics of the inlet pipe (tube 116) such as roughness, shape and size. The large number of factors involved makes it difficult to provide a general estimation procedure for determining the necessary minimum length of the streamline section of the nozzle supply pipe or tube 116. However, this tube 116 length can be readily determined by trial and error observation for particular combinations of nozzle 114, discharge rate, supply tube 116 size, and water flow conditions in the supply headers 100, 108, 166.

Figure 6:
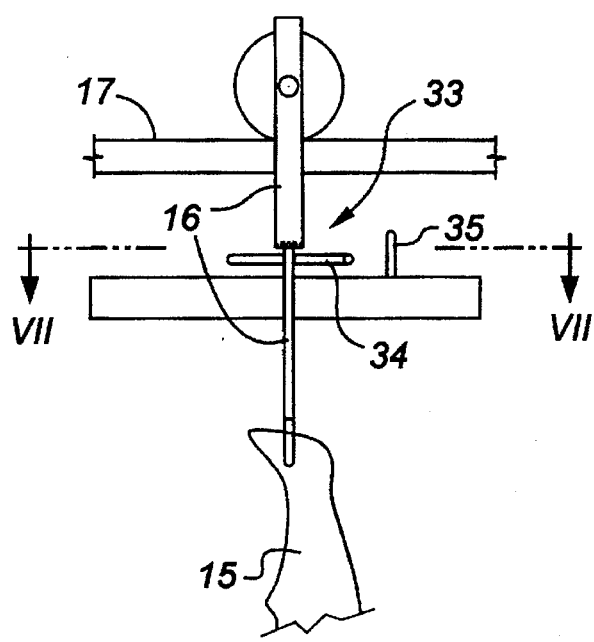
FIG. 6 is a partial side view of a gambrel with a turning arm attached thereto to enable optional carcass rotation upon contact with a post.
Figure 7:
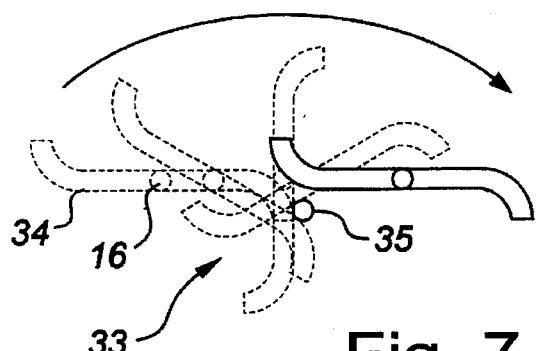
FIG. 7 shows five superimposed positions of the turning arm of FIG. 6, as it rotates due to contact with a post.

As in the first embodiment, the carcass 106 may be rotated in the manner previously discussed with reference to FIGS. 6 and 7.

The effectiveness of the present invention to pasteurize hog carcasses was demonstrated in experiments performed in a prototype pasteurization system. The results are presented in the following examples. It should be understood that the primary process conditions of processing time (speed of moving the carcass through the housing), water temperature and water flowrate are interrelated. Pasteurization of surface bacteria is achieved when the bacteria temperature is raised to a pasteurization temperature for a sufficient period of time so as to destroy the bacteria. Such a pasteurization/contact time relationship is documented in the literature, or may be readily developed by persons skilled in the art. Increasing the water flowrate will generally increase the rate of temperature rise of the carcass surface. Thus, these conditions (combination of settings) may be varied within acceptable ranges to provide a desired pasteurizing effect. The process of the present invention can advantageously be conducted in as a continuous line process, the pasteurization cabinet 1 being added to a conventional, existing overhead dressing rail process line.

EXAMPLE 1

A pasteurization system was constructed generally as illustrated in FIGS. 1 to 5 with the exception of the physical placement of the headers for each array of nozzles and the orientation of the second array of nozzles. The header supplying the nozzles was located at one end, resulting in a greater differential pressure drop along each nozzle resulting in a less than optimal distribution of water. The second array, rather than providing nozzles which extend longitudinally (as preferred and as shown in FIGS. 1 and 2), had nozzles which were spaced in a parallel manner, aligned transverse to the longitudinal axis of the housing.

The internal dimensions of the housing were approximately 1.8 m long by 0.6 m wide by 2.3 m high. A 25 HP pump circulated about 500 USgpm of water, delivered at about 22 psig to the first and the second array of nozzles. The discharge pressure at the nozzles was about 4 psig, (slightly higher for lower, second array of nozzles). The nozzles were constructed from stainless steel as detailed in Table I as follows:

TABLE I

| | |
|---|---|
| First array (Overhead): | |
| Number of nozzles | 6 |
| Length of nozzles | 1.2 meters |
| C-to-C tube spacing | 0.07 meters |
| Second array (Lower): | |
| Number of nozzles | 9 |
| Length of nozzles | 0.5 meters |
| C-to-C tube spacing | 0.15 meters |
| Length of nozzle slot | 0.10 meters |
| Outer tube: | |
| Outside diameter | 1.5 inches |
| Inside Diameter | 1.375 inches |
| Slot width | 0.25 inches |
| Inner tube (¾", Sch. 40): | |
| Outside diameter | 1.050 inches |
| Inside Diameter | 0.824 inches |
| Orifices: | |
| Spacing | 0.5 inches |
| Diamater | ⅛ inches |

Figure 8:
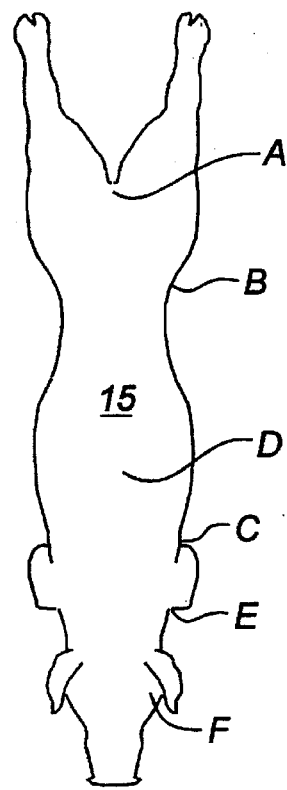
FIGS. 8 and 9 show a legend to bacteria sampling sites A–F identified in the Examples.
Figure 9:
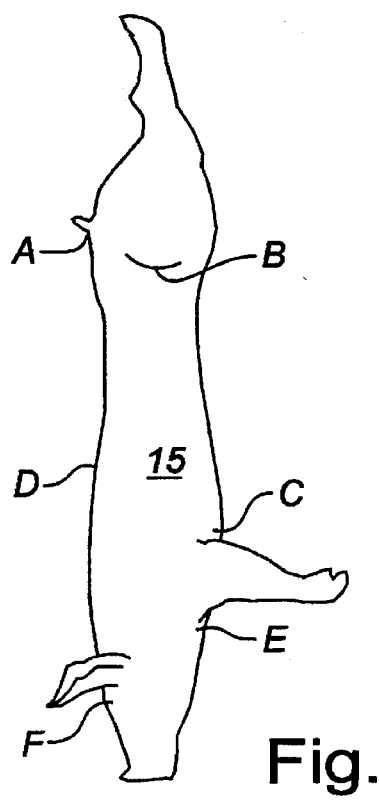
Figure 10A:
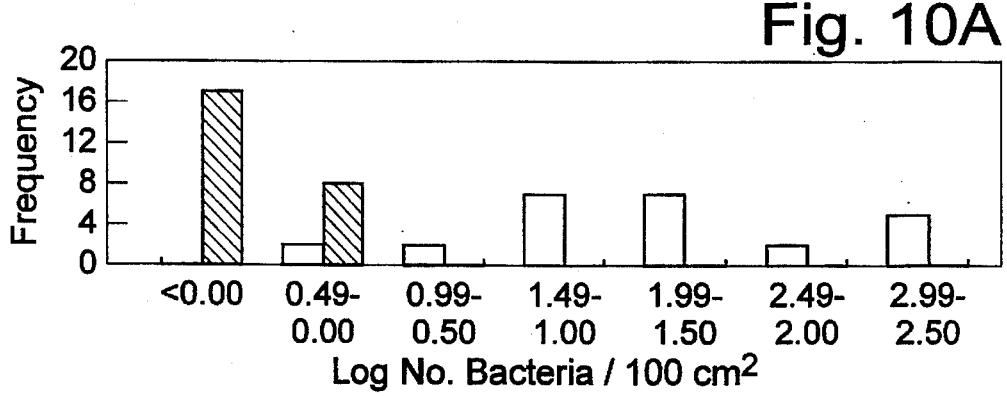
FIG. 10A is a plot of distributions of the log numbers of E. coli recovered from unpasteurized and pasteurized (shaded blocks) pig carcasses recovered from the back of the carcasses.
Figure 10B:
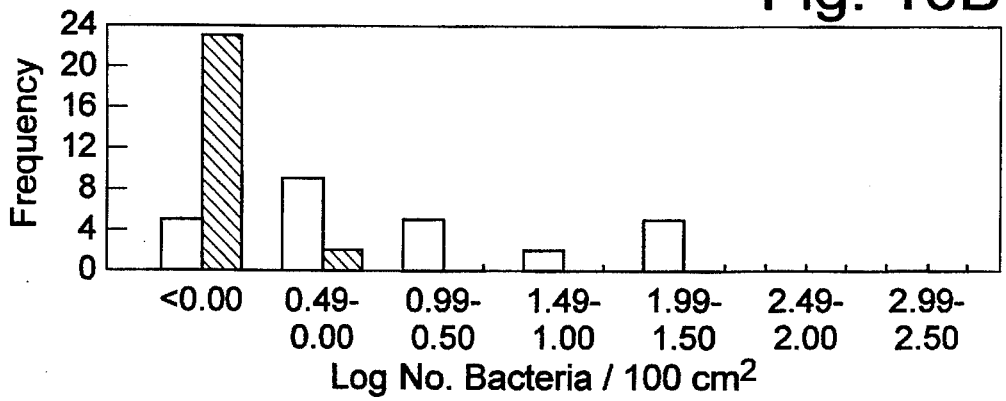
FIG. 10B is a plot of distributions of the log numbers of E. coli recovered from unpasteurized and pasteurized (shaded blocks) pig carcasses recovered from the waist of the carcasses.
Figure 10C:
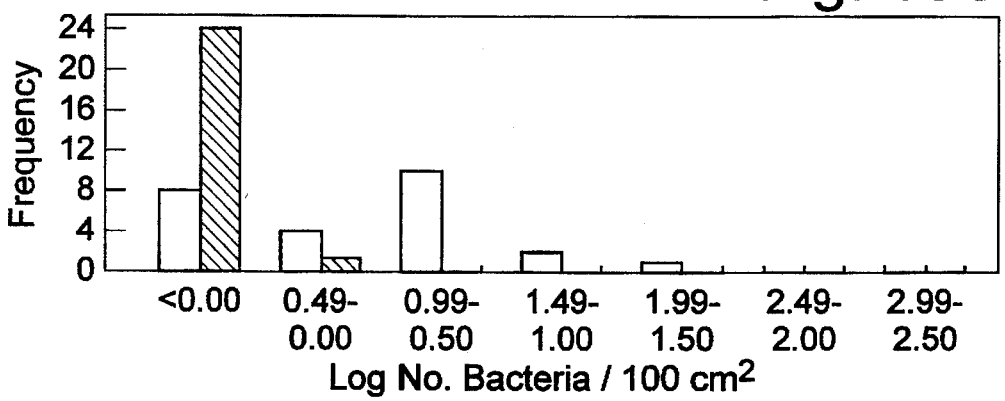
FIG. 10D is a plot of distribution of the log numbers of E. coli recovered from unpasteurized and pasteurized (shaded blocks) pig carcasses recovered from the front leg of the carcasses.
FIG. 10E is a plot of distribution of the log numbers of E. coli recovered from unpasteurized and pasteurized (shaded blocks) pig carcasses recovered from the belly of the carcasses.
Figure 10D:
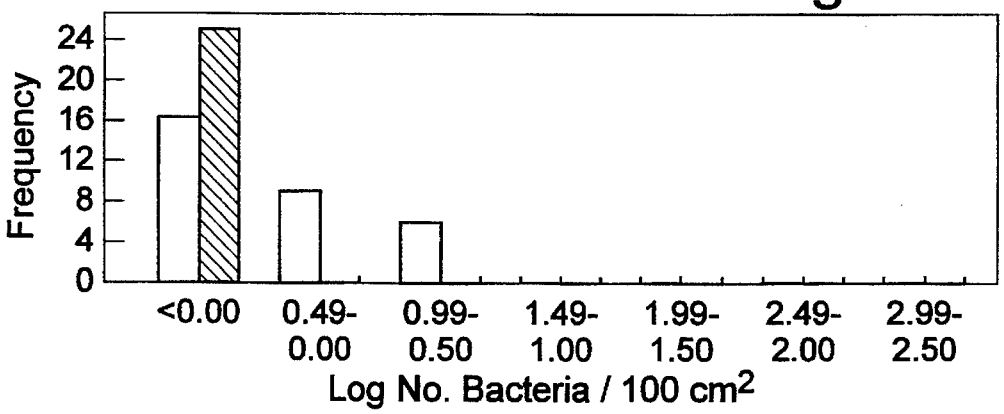

Experiments were first performed to determine which areas of the carcasses were the most difficult to pasteurize. Shaving cream was applied to the carcasses. The carcasses were treated in the cabinet and observations were made regarding the sites from which the cream was most difficult to remove. Those areas were assumed to be the most resistive to the pasteurization process. Five sampling sites A–F were identified, as shown in FIGS. 8 and 9. The first array of overhead nozzles effectively removed (1 sec.) the cream from areas C and D, with areas A and B being the most persistent (4 sec.). The second array of lower nozzles were required to remove the cream from areas E and F within 1 second.

Prior to treatment by the process of the present invention, uneviscerated hog carcasses from a commercial slaughtering plant were subjected to a scalding process, destroying nearly all bacteria, with total numbers remaining at about $10^4$ bacteria/100 $cm^2$. A rubber flailing-type apparatus de-haired and polished the carcasses, reintroducing flora, including bacteria responsible for spoilage (spoilage bacteria), up to as high as about $10^6$ bacteria/100 $cm^2$. The flora was typically comprised of equal quantities of psychrotropic, thermally sensitive, and spoilage bacteria and saprophytic mesophiles, including thermoduric species.

Thirty (30) carcasses were sampled after pasteurization treatments using the apparatus and method of the present invention. The temperature of the heated water and the treatment time were varied. Bacterial count results were obtained from carcass areas A–F. The results were averaged from 20 samples acquired at each condition. Overall, the best performance was achieved at exposures of 20 seconds or more to water at temperatures of 85° C. The average numbers of bacteria remaining after treatment were consistently reduced to less than 4 bacteria/$cm^2$. It should be noted that saprophytic mesophiles are included in this count which encompass some thermoduric species which are resistant to the pasteurization process. The saprophytic mesophiles are neither toxin forming nor pathogenic and do not contribute to meat spoilage. Table II presents average bacterial results, detailing the distribution of bacteria at the various trial conditions.

TABLE II

| Treatment | | | Flora Composition % | | |
|---|---|---|---|---|---|
| Time sec | Temp °C. | Total Count #/$cm^2$ | Gram – ve Spoilage | Gram + ve Spoilage | Saprophytic mesophiles |
| not treated | | $8.9 \times 10^2$ | 39 | 6 | 55 |
| 30 | 60 | $2.0 \times 10^2$ | 17 | 1 | 82 |
| 60 | 60 | $4.0 \times 10^2$ | 13 | 4 | 83 |
| 40 | 75 | $4.7 \times 10^2$ | 50 | | 50 |
| 40 | 80 | $2.4 \times 10^2$ | 11 | | 89 |
| 40 | 85 | 4 | 11 | | 89 |

EXAMPLE 2

A batch of 500 carcasses was processed without pasteurization, and a second batch of 500 was processed for 20 seconds using the process present invention as described in Example 1 with water heated to 85° C.

Of the pasteurized batch of carcasses, 25 samples were collected from each of four areas, each sample being obtained from one of 100 carcasses selected at random. 100 $cm^2$ of surface was swabbed from each of the areas identified as A, B, C, and E. Each swab sample was separately processed for the enumeration of *Escherichia coli* (*E. coli*), a known indicator for the presence of enteric pathogens and a good indicator of the response to heating of spoilage bacteria.

As shown in FIG. 10A–10D, the numbers of *E. coli* on unpasteurized carcasses were strongly dependent upon sampling location, varying from <10 (belly area C) to $9 \times 10^2$/100 $cm^2$ (back area A). After pasteurizing, the numbers of *E. coli* ranged from "not detectable" on most samples to, at most, 2/100 $cm^2$ for the back area A.

FIGS. 10A–10D illustrate that non-thermoduric contaminants, over the whole surface of the carcasses, were consistently reduced by $\log_{10}(2.5)$ as a result of pasteurization using the apparatus and method of the present invention. FIGS. 10A–10D thus illustrate that the apparatus and process of the present invention has a pasteurizing effect on dehaired hog carcasses.

All publications mentioned in this specification are indicative of the level of skill of those skilled in the art to which this invention pertains. All publications are herein incorporated by reference to the same extent as if each individual publication was specifically and individually indicated to be incorporated by reference.

The terms and expressions in this specification are used as terms of description and not of limitation. There is no intention, in using such terms and expressions, of excluding equivalents of the features illustrated and described, it being recognized that the scope of the invention is defined and limited only by the claims which follow.

The embodiments of the invention in which an exclusive property or privilege is claimed are defined as follows:

1. An apparatus for the pasteurization of animal carcasses which are suspended from and conveyed on a gambrel and gambrel support system, and rail assembly, comprising:

a stationary housing providing an enclosure and having a longitudinal axis along which animal carcasses are conveyed;

a plurality of first distributing elements positioned within the housing above the carcass, each dispensing and directing, when supplied with a source of heated water under pressure, a discrete and substantially continuous sheet of heated water downwardly on top of the carcass such that each sheet remains substantially intact until it contacts the carcass, for pasteurization of the upper and lateral surfaces of the carcass;

a plurality of second distributing elements positioned within the housing substantially below the carcass, each dispensing and directing, when supplied with a source of heated water under pressure, a discrete and substantially continuous sheet of heated water upwardly such that each sheet remains substantially intact until it contacts the carcass, for pasteurization of the underside of the carcass; and means for supplying heated water under pressure to the first and second water distributing elements, each of the first and second distributing elements comprising concentric, coextensive inner and outer tubes forming an annulus therebetween, a plurality of openings formed in the wall of the first tube for discharge of heated water to the annulus, and an axially-extending opening formed in the wall of the outer tube, the outer tube openings being offset from the inner tube openings such that heated water is dispensed and directed from the annulus through the outer tube openings in the form of a substantially continuous sheet of water, whereby, when heated water under pressure is supplied to the first and second distributing elements, a flowing layer of heated water is formed over the exterior contours of the carcass.

2. The apparatus as set forth in claim 1 wherein the housing further comprises a top ceiling below the rail having a slotted opening extending there through along its longitudinal axis, the slotted opening being sufficiently wide for conveyance of the gambrel support therealong; and means for sealing the slotted openings around the gambrel support to prevent debris from the rail entering the housing.

3. The apparatus as set forth in claim 1 wherein the first and second distributing elements are arranged in arrays along the longitudinal axis of the housing such that the water is dispensed in spaced, substantially parallel sheets.

4. An apparatus for the pasteurization of animal carcasses which are suspended from and conveyed on a gambrel and gambrel support system and rail assembly, comprising:

a stationary housing providing an enclosure and having a longitudinal axis along which carcasses are conveyed;

a plurality of first distributing elements positioned within the housing above the carcass, each dispensing and directing, when supplied with a source of heated water under pressure, a discrete and substantially continuous sheet of heated water downwardly on top of the carcass such that each sheet remains substantially intact until it contacts the carcass, for pasteurization of the upper and lateral surfaces of the carcass;

a plurality of second distributing elements positioned within the housing substantially below the carcass, each dispensing and directing, when supplied with a source of heated water under pressure, a discrete and substantially continuous sheet of heated water upwardly such that each sheet remains substantially intact until it contacts the carcass, for pasteurization of the underside of the carcass;

means for supplying heated water under pressure to the first and second water distributing elements; and each of the first and second distributing elements comprising a point source nozzle, wherein each point source nozzle comprises a nozzle body having an inner bore through which a stream of water is delivered under pressure and a deflector projecting from the nozzle body for shaping and directing the stream of water to form a discrete and substantially continuous sheet of water directed toward the carcass, the deflector having a smooth, arcuate inner deflection surface which is continuous with the wall of the inner bore and which curves smoothly across the axis of the inner bore, whereby, when heated water under pressure is supplied to the first and second distributing elements, a flowing layer of heated water is formed over the exterior contours of the carcass.

5. The apparatus as set forth in claim 4 wherein the first distributing elements are spaced along the two upper, inside longitudinal edges of the housing.

6. The apparatus as set forth in claim 5 wherein the first distributing elements dispense substantially continuous sheets of water which meet or overlap at or near the center of the housing.

7. The apparatus as set forth in claim 6 wherein the housing further comprises a top ceiling below the rail having a slotted opening extending there through along its longitudinal axis, the slotted opening being sufficiently wide for conveyance of the gambrel support therealong; and means for sealing the slotted openings around the gambrel support to prevent debris from the rail entering the housing.

8. The apparatus as set forth in claim 7 wherein the sheets of water are dispensed in a substantially vertical plane.

9. The apparatus as set forth in claim 1 wherein the water distribution means further comprises a plurality of third distributing elements positioned on either side of the housing, each dispensing and directing, when supplied with a source of heated water under pressure, a discrete and substantially continuous sheet of heated water that remains substantially intact until it contacts the carcass, laterally for pasteurization of the lateral portions of the carcass which are otherwise shielded from the flowing layer of water.

10. The apparatus as set forth in claim 9, further comprising a plurality of third distributing elements positioned on either side of the housing, each dispensing and directing, when supplied with a source of heated water under pressure, a discrete and substantially continuous sheet of heated water that remains substantially intact until it contacts the carcass, laterally for pasteurization of the lateral portions of the carcass which are otherwise shielded from the flowing layer of water, wherein the third distributing elements comprise concentric, coextensive inner and outer tubes forming an annulus therebetween, a plurality of openings formed in the wall of the first tube for discharge of heated water to the annulus, and an axially-extending opening formed in the wall of the outer tube, the outer tube openings being offset from the inner tube openings such that heated water under pressure is dispensed and directed from the annulus through the outer tube openings in the form of a substantially continuous sheet of water.

11. The apparatus as set forth in claim 10 wherein the housing further comprises a top ceiling below the rail having a slotted opening extending there through along its longitudinal axis, the slotted opening being sufficiently wide for conveyance of the gambrel support therealong; and means for sealing the slotted openings around the gambrel support to prevent debris from the rail entering the housing.

12. The apparatus as set forth in claim 4 further comprising a plurality of third distributing elements positioned on either side of the housing, each dispensing and directing, when supplied with a source of heated water under pressure, a discrete and substantially continuous sheet of heated water that remains substantially intact until it contacts the carcass, laterally for pasteurization of the lateral portions of the carcass which are otherwise shielded from the flowing layer of water, wherein each third distributing element comprises a point source nozzle.

13. A process of pasteurizing animal carcasses which are suspended in a stationary housing, comprising:

(a) dispensing and directing a plurality of discrete and substantially continuous sheets of heated water downwardly onto the carcass so that a flowing layer of heated water is formed over the exterior contours of the carcass for a time and at a temperature sufficient for pasteurization of the upper and lateral surfaces of the carcass, while (b) simultaneously dispensing and directly a plurality of discrete and substantially continuous sheets of heated water upwardly for contacting the underside of the carcass at a temperature and for a time sufficient for pasteurizing the underside of the carcass.

14. The process as set forth in claim 13 further comprising:

(c) simultaneously dispensing and directing a plurality of discrete and substantially continuous sheets of heated water laterally from opposing sides of the carcass for contacting the lateral sides of a carcass at a temperature and for a time sufficient for pasteurizing the lateral sides of the carcass.

15. A process of pasteurizing animal carcasses which are suspended in a stationary housing, comprising:

(a) dispensing and directing a plurality of discrete and substantially continuous sheets of heated water downwardly onto the carcass so that a flowing layer of heated water is formed over the exterior contours of the carcass, wherein said water is heated to 85° C. and the upper and lateral surfaces of the carcasses are contacted for at least 10 seconds; and (b) simultaneously with step (a) dispensing and directing a plurality of discrete and substantially continuous sheets of heated water upwardly, wherein said water is heated to 85° C. and the underside of the carcass is contacted with the heated water for at least 10 seconds, whereby the exterior surfaces of said carcasses are pasteurized.

16. The process of claim 15 wherein said carcass is an eviscerated and de-haired hog carcass.

17. The process of claim 15, further comprising:

(c) simultaneously dispensing and directing a plurality of substantially continuous sheets of heated water laterally from opposing sides of the carcass, wherein said water is heated to 85° C. and the lateral surfaces of the carcass are contacted with said heated water for at least 10 seconds, whereby the upper, lower and lateral surfaces of the carcasses are pasteurized.

18. The process as set forth in claim 13, wherein the carcass is an eviscerated animal carcass.

* * * * *

UNITED STATES PATENT AND TRADEMARK OFFICE
CERTIFICATE OF CORRECTION

PATENT NO. : 5,651,730

DATED : July 29, 1997

INVENTOR(S) : McGinnis et al.

It is certified that error appears in the above-identified patent and that said Letters Patent is hereby corrected as shown below:

In the Abstract:  At line 5, delete "scaled" and replace with --sealed--.

In the Figures:  Delete Figure 5A.

At column 1, at line 39, delete "like and" and replace with --life of--; at line 41, delete "decreases" and replace with --decreased--.

At column 2, line 11, delete "Hell" and replace with --Bell--; at line 14, delete "heater" and replace with --heaters--.

At column 3, line 8, delete "wheel" and replace with --wheeled--; at line 34, delete "provided' and replace with --providing--.

At column 4, line 39, delete "D" and replace with --C--; at line 43, delete "E" and replace with --D--.

At column 5, line 55, delete "now" and replace with --not--; at line 57, after "air-to-air" insert --heat--.

At column 6, line 26, delete "extend" and replace with --extent--; at line 37, delete "flow" and replace with --flows--.

At column 7, line 24, delete "later" and replace with --lateral--; at line 42, delete "A" and replace with --As--.

At column 9, line 32, delete "are"; at line 50, delete "fan-shaped" and replace with --fan-like--.

At column 10, line 3, delete "of" and replace with --or--.

UNITED STATES PATENT AND TRADEMARK OFFICE
CERTIFICATE OF CORRECTION

PATENT NO. : 5,651,730

DATED : July 29, 1997

INVENTOR(S) : McGinnis et al.

It is certified that error appears in the above-identified patent and that said Letters Patent is hereby corrected as shown below:

At column 12, line 38, delete "combination" and replace with --combinations--.

In the Claims:

At claim 13, column 17, line 16, delete "directly" and replace with --directing--.

At claim 15, at line 6, delete "carcasses" and replace with --carcass--.

At claim 17, line 26, delete "carcasses" and replace with --carcass--.

Signed and Sealed this

Thirty-first Day of March, 1998

Attest:

BRUCE LEHMAN

Attesting Officer

Commissioner of Patents and Trademarks